United States Patent
Sato et al.

(10) Patent No.: US 7,751,556 B2
(45) Date of Patent: Jul. 6, 2010

(54) APPARATUS AND METHOD OF GENERATING FALSIFICATION DETECTING DATA OF ENCRYPTED DATA IN THE COURSE OF PROCESS

(75) Inventors: Katsuhiko Sato, Soraku-gun (JP); Yuji Sawada, Osaka (JP)

(73) Assignee: Sharp Kabushiki Kaisha, Osaka-Shi (JP)

( * ) Notice: Subject to any disclaimer, the term of this patent is extended or adjusted under 35 U.S.C. 154(b) by 1109 days.

(21) Appl. No.: 10/483,625

(22) PCT Filed: Jul. 10, 2002

(86) PCT No.: PCT/JP02/07031

§ 371 (c)(1),
(2), (4) Date: Jan. 14, 2004

(87) PCT Pub. No.: WO03/013054

PCT Pub. Date: Feb. 13, 2003

(65) Prior Publication Data

US 2004/0172543 A1 Sep. 2, 2004

(30) Foreign Application Priority Data

Jul. 17, 2001 (JP) .............................. 2001-216138

(51) Int. Cl.
*H04L 9/00* (2006.01)
(52) U.S. Cl. ............................. 380/28; 380/29; 380/37; 380/42; 713/153; 713/155; 713/166; 713/168
(58) Field of Classification Search .................... 380/28, 380/29, 37, 42; 713/153, 155, 166, 168
See application file for complete search history.

(56) References Cited

U.S. PATENT DOCUMENTS

| | | | | | |
|---|---|---|---|---|---|
| 5,440,633 | A | * | 8/1995 | Augustine et al. | 713/161 |
| 5,479,512 | A | * | 12/1995 | Weiss | 380/28 |
| 5,740,251 | A | * | 4/1998 | Tajima et al. | 380/269 |
| 6,067,121 | A | | 5/2000 | Shigihara | |

(Continued)

FOREIGN PATENT DOCUMENTS

CN 1141559 A 1/1997

(Continued)

OTHER PUBLICATIONS

Vijay Varadharajan and Rajan Shankaran; "Security for ATM Networks"; 1997 IEEE; pp. 475-480.*

(Continued)

*Primary Examiner*—Carl Colin
(74) *Attorney, Agent, or Firm*—Birch, Stewart, Kolasch & Birch, LLP

(57) ABSTRACT

Data to be encrypted (301) is partially extracted successively. A result of encrypting a previously extracted portion of the data is used to successively calculate that of encrypting the currently extracted portion of the data successively. Successively calculated results of the encryption are used to generate encrypted data (305). In generating the encrypted data, a finally calculated result of the encryption (PF(z+1)) is attached to the generated encrypted data. The finally calculated result is used as falsification detecting data (308) for detecting whether the data to be encrypted is falsified data.

24 Claims, 16 Drawing Sheets

U.S. PATENT DOCUMENTS

| | | | |
|---|---|---|---|
| 6,510,519 B2 * | 1/2003 | Wasilewski et al. | 713/168 |
| 6,711,709 B1 * | 3/2004 | York | 714/748 |
| 6,832,314 B1 * | 12/2004 | Irvin | 713/162 |
| 6,959,384 B1 * | 10/2005 | Serret-Avila | 713/176 |
| 6,970,848 B2 * | 11/2005 | Osaka et al. | 705/51 |
| 6,973,187 B2 * | 12/2005 | Gligor et al. | 380/28 |
| 7,095,850 B1 * | 8/2006 | McGrew | 380/42 |
| 7,103,181 B2 * | 9/2006 | Ananth | 380/37 |
| 7,110,539 B1 * | 9/2006 | Bao et al. | 380/28 |
| 2001/0014154 A1 * | 8/2001 | Aikawa et al. | 380/37 |
| 2002/0048364 A1 * | 4/2002 | Gligor et al. | 380/37 |
| 2002/0083319 A1 * | 6/2002 | Ishiguro et al. | 713/168 |
| 2004/0111610 A1 * | 6/2004 | Slick et al. | 713/160 |
| 2004/0252836 A1 * | 12/2004 | Yoshida et al. | 380/268 |
| 2006/0056637 A1 * | 3/2006 | Rezaiifar et al. | 380/274 |
| 2006/0291650 A1 * | 12/2006 | Ananth | 380/46 |

FOREIGN PATENT DOCUMENTS

| | | |
|---|---|---|
| JP | 61-154331 | 7/1986 |
| JP | 9-97175 A | 4/1997 |
| JP | 2000-122861 A | 4/2000 |
| KR | 1999-0053174 | 7/1999 |

OTHER PUBLICATIONS

Meyer, Carl H. et al., Cryptography; A New Dimension in Computer Data Security, Feb. 10, 1986, Shizensya Co. Ltd., pp. 64-73 and 103-109 (English Translation of Relevant Portion).

Schneier, Bruce, Applied Cryptography, Second Edition, (1996) Chapter 2, pp. 21-46.

Schneier, Bruce, Applied Cryptography, Second Edition, (1996) Chapter 18, pp. 429-459.

Schneier, Bruce, Applied Cryptography, Protocols, Algorithms, and Source Code in C, 1st Ed., John Wiley & Sons, Inc. 1994, Chapter 2, pp. 19-41 and Chapter 14, pp. 321-346.

Okamoto, Eiji; "Ango Riron Nyumon" 1993, pp. 131-132.

Menezes, A.J., et al.: "Handbook of Applied Cryptography" 1997, CRC Press, US, Boca Raton 228210, XP002357451.

Jutla C S: "Encryption modes with almost free message integrity" Advances in Cryptology— Eurocrypt 2001. International Conference on the Theory and Application of Cryptographic Techniques. Proceedings ( Lecture Notes in Computer Science vol. 2045) Springer — Verlag Berlin, Germany, 2001, pp. 529-544, XP02357449 ISBN:3-540-42070-3.

* cited by examiner ously distributed. Such

APPARATUS AND METHOD OF GENERATING FALSIFICATION DETECTING DATA OF ENCRYPTED DATA IN THE COURSE OF PROCESS

TECHNICAL FIELD

The present invention relates to encryption technology for generating encrypted data capable of detecting falsification of electronic data, and decryption technology for decrypting the encrypted data.

BACKGROUND ART

Programs and data requiring copyright protection or highly confidential data are transmitted and received over networks, and recorded in compact disc-read only memory (CD-ROM) or other recording media and commercially distributed. Such data can be accessed and falsified by a third party unauthorized to access the data. To prevent this, the data are encrypted.

Data to be communicated is encrypted, for example as described with reference to FIG. 15. Initially, the sender reads data to be encrypted (step (S)1001) and a hash function is used to calculate a message digest (MD), a check character string for detection of falsification (S1002). Falsification may be detected by an approach other than calculating an MD. It may be detected by a different approach for example utilizing a cyclic redundancy check (CRC) code. The data to be encrypted is then encrypted in accordance with a prescribed encryption technique (S1003) and to the encrypted data the MD obtained at S1002 is attached and they are thus transmitted to a counterpart (S1004).

The recipient effects an inverted version of this process, although not shown. More specifically, the recipient having received encrypted data initially performs a decryption process and then calculates an MD. This calculated MD and the MD attached to the received encrypted data are compared. If they match, a decision is made that the received data is normal data free of falsification.

FIG. 16 schematically shows the above described data flow. In FIG. 16, data to be encrypted 101 is previously divided into z subdata Ni, wherein i=1 to z. At S1 and S2, for each data Ni a hash function is used to perform a hash function process, and encryption process information and a parameter modification portion are used to perform an encryption process. As a result, encrypted data Mi is generated, wherein i=1 to z. In doing so, the hash function process's final result is attached as a falsification detecting check character string MD to encrypted data M1-Mz to complete encrypted data 102. To decrypt encrypted data 102, initially at S3 encrypted data Mi is subjected to a decryption process using decryption process information and a parameter modification portion to obtain decrypted data 103 formed of data Pi, wherein i=1 to z. Then at S4 all data Pi undergo a hash function process to calculate check character string MD. The calculated check character string MD are compared with the falsification detecting check character string MD included in encrypted data 102 and if the MDs match then a decision is made that encrypted data M1-Mz are not falsified data and if the MDs fail to match then a decision is made that the data are falsified data.

The above described conventional encryption process requires two steps: calculating a falsification detecting check character string, and encrypting data. The decryption process also requires the two steps of decrypting data and calculating a falsification detecting check character string for comparison. Each of these steps has a significantly large amount of processing, and apparatuses performing encryption and decryption processes would require long periods of time before they complete encryption for transmission and decryption for reproduction. This is an obstacle to performing in real time a process, for example distributing content from a server via a network to a mobile terminal corresponding to a client, and immediately reproducing the content at the mobile terminal. In other words, the mobile terminal, having a low processing capability, requires a long period of time to reproduce the received content, which provides poor practical utility.

Furthermore, content legitimately obtained can nevertheless have its data partially lost or replaced with other data during transmission and reception via a network or in a medium having the content storing therein. In that case, to again obtain the legitimate content, the content's entire data must be received and a significantly long period of time is accordingly consumed to transfer the data.

Japanese Patent Laying-Open No. 2000-122861 discloses a technique employed to prevent falsification of software, data and the like. In this technique, such a hash function as described above is utilized to detect falsification. Furthermore in this technique the data to be encrypted is divided into a plurality of blocks each serving as a unit and whenever a block is subjected to an encryption process the block's encryption key is calculated, which is significantly time consuming.

DISCLOSURE OF THE INVENTION

The present invention contemplates an apparatus and method that allows a reduced amount of processing, a program that causes a computer to perform the method, and a medium having the program recorded therein.

To achieve the above object the present invention in one aspect provides an encryption method and apparatus encrypting data to generate encrypted data. As this encryption is effected, a result of the encryption is calculated. The result is indicated by data, which is attached to the encrypted data. This data indicating the result of the encryption represents falsification detecting data for detecting whether the encrypted data is falsified data. Thus, while encrypted data is generated, falsification detecting data can be obtained. This can eliminate the necessity of calculating falsification detecting data separately from generating encrypted data. Encryption can be achieved with a reduced amount of processing.

To achieve the above object, the present invention in another aspect provides a method and apparatus that detects falsification of encrypted data. It receives and decrypts encrypted data to generate decrypted data. As this decryption is effected, a result of the decryption is calculated. This result is indicated by data, which represents falsification detecting data for detecting whether the encrypted data is falsified data. Thus, while decrypted data is generated, falsification detecting data can be obtained. This can eliminate the necessity of calculating falsification detecting data separately from generating decrypted data. Decryption can be achieved with a reduced amount of processing.

In the above described method and apparatus detecting falsification of encrypted data preferably the encrypted data is decrypted for each data block of a prescribed size to generate decrypted block data for the data block. For each decrypted block data calculated as the decryption is effected, data indicating a result of decrypting encrypted block data is compared with falsification detecting data attached to the data block and from the resultant comparison whether the encrypted data is falsified data is detected. The encrypted data can have falsification detecting data attached thereto for each data block. For each data block whether encrypted data is falsified data or not can be determined. If a decision is made that falsification is present, the encrypted data's falsified portion can be located by the block. Other data blocks than that corresponding to the falsified portion can normally be decrypted.

The present invention in still another aspect provides a method and apparatus reproducing encrypted data previously divided into a plurality of blocks. It extracts portions of the data from prescribed blocks sequentially. A result of decrypting a previously extracted portion of the data is used to sequentially calculate a result of decrypting the currently extracted portion of the data and sequentially calculated results of decrypting the data are used to generate decrypted data. Data indicating a final, resultant decryption calculated in generating the decrypted data is compared with falsification detecting data previously correlated with a prescribed block and from the resultant comparison whether decrypted data corresponding to the generated, prescribed block should be reproduced is determined.

Thus the falsification detecting data can be correlated with the encrypted data for each prescribed block. For each prescribed block whether the encrypted data is falsified data can be determined. For each prescribed block whether the corresponding decrypted data is reproducible can be determined.

In the above described method and apparatus reproducing encrypted data preferably the encrypted data is data obtained by encrypting content to be reproduced and from the encrypted data's plurality of blocks one or more blocks corresponding to a data size corresponding to an amount of the content reproducible at a time can be selected and decrypted.

A selected one or more blocks of the content can be decrypted earlier than the other block(s) for reproduction. Reproducing encrypted content can be started before the entire content is completely decrypted.

BEST MODES FOR CARRYING OUT THE INVENTION

Hereinafter the present invention in embodiments will be described with reference to the drawings more specifically.

First Embodiment

Figure 1:
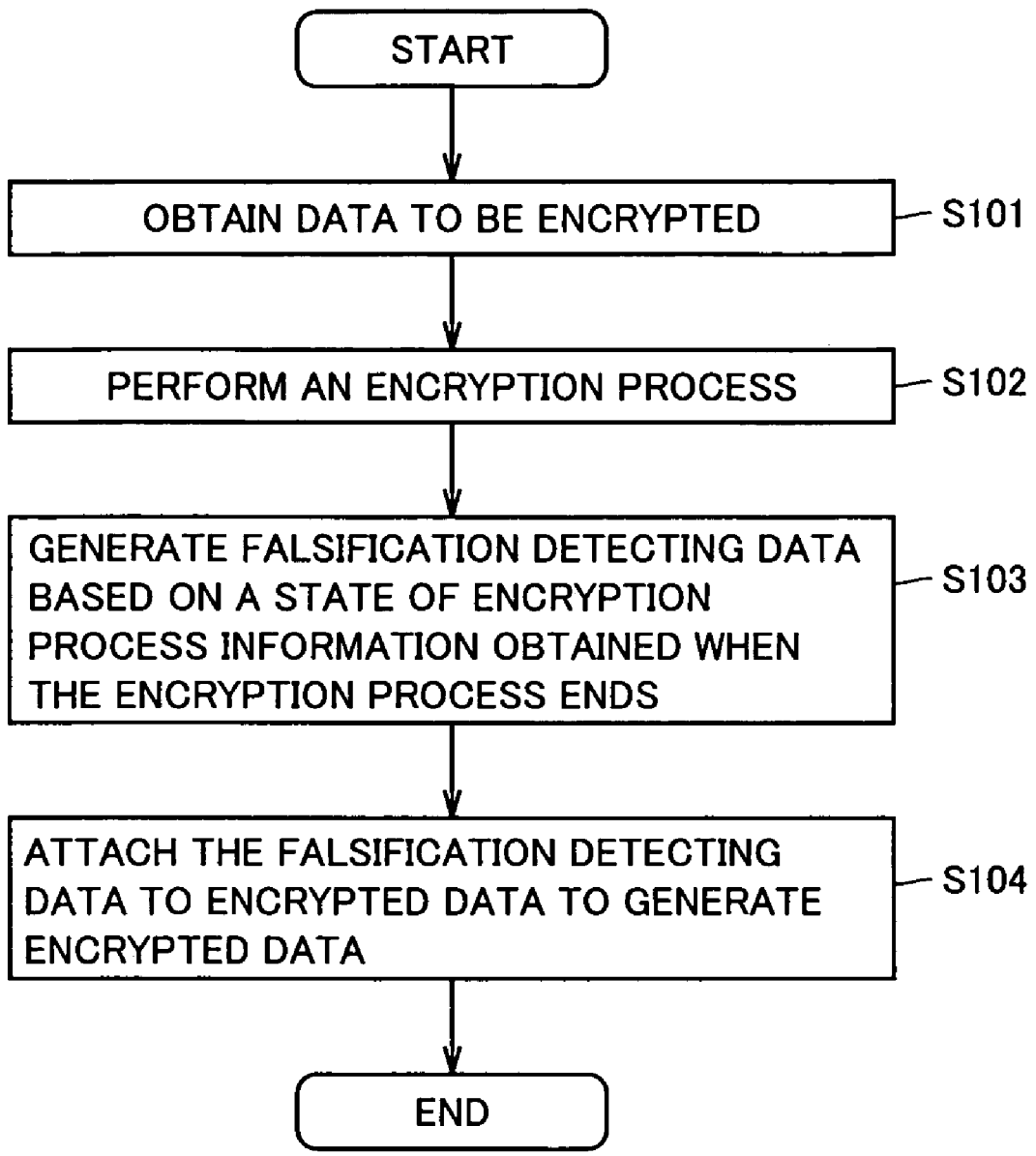
FIG. 1 is a flow chart of an encryption process in a first embodiment.

FIG. 1 shows a procedure of an encryption process in accordance with the present embodiment. This procedure employs an encryption algorithm that is applicable to any encryption systems in which a result of encryption and that of decryption are identical information and in encryption and decryption processes a previous operation's result is utilized to sequentially calculate the current operation's result. As such, a common-key encryption system or other similar, generally employed encryption systems can be used and for example it can be implemented by processing a well known data encryption standard (DES) in accordance with a procedure referred to as a cipher block chaining (CBC) mode. Note that the CBC mode is a method of encryption involving chaining and employs a previous encryption result to calculate the current encryption result successively.

With reference to FIG. 1, in the encryption process, data to be encrypted is initially obtained (S101). Although not shown, in each embodiment encryption and decryption processes are performed in a general-purpose personal computer, a mobile terminal device, a mobile phone or similar information processing apparatus (hereinafter simply referred to as and "information processing apparatus"). As such, the data to be encrypted can be obtained for example from a CD-ROM or other similar recording medium, a hard disk internal to an information processing apparatus, and a server via a network.

The obtained data to be encrypted is then encrypted in accordance with an encryption algorithm (S102). In doing so, the data to be encrypted is encrypted sequentially from the top by a unit of data of a prescribed size. Encrypted data is thus generated. For each data unit a calculation is performed and an encryption thus results, which serves an encryption parameter value (hereinafter referred to as "encryption process information") used to calculate encryption process information of a subsequent unit of data.

When the entirety of the data to be encrypted has completely been encrypted and encrypted data is thus generated, the current, final encryption process information is used to generate falsification detecting data (S103). The falsification detecting data thus generated is attached to the encrypted data. The encrypted data is thus completed (S104). The encryption process thus ends.

Figure 2:
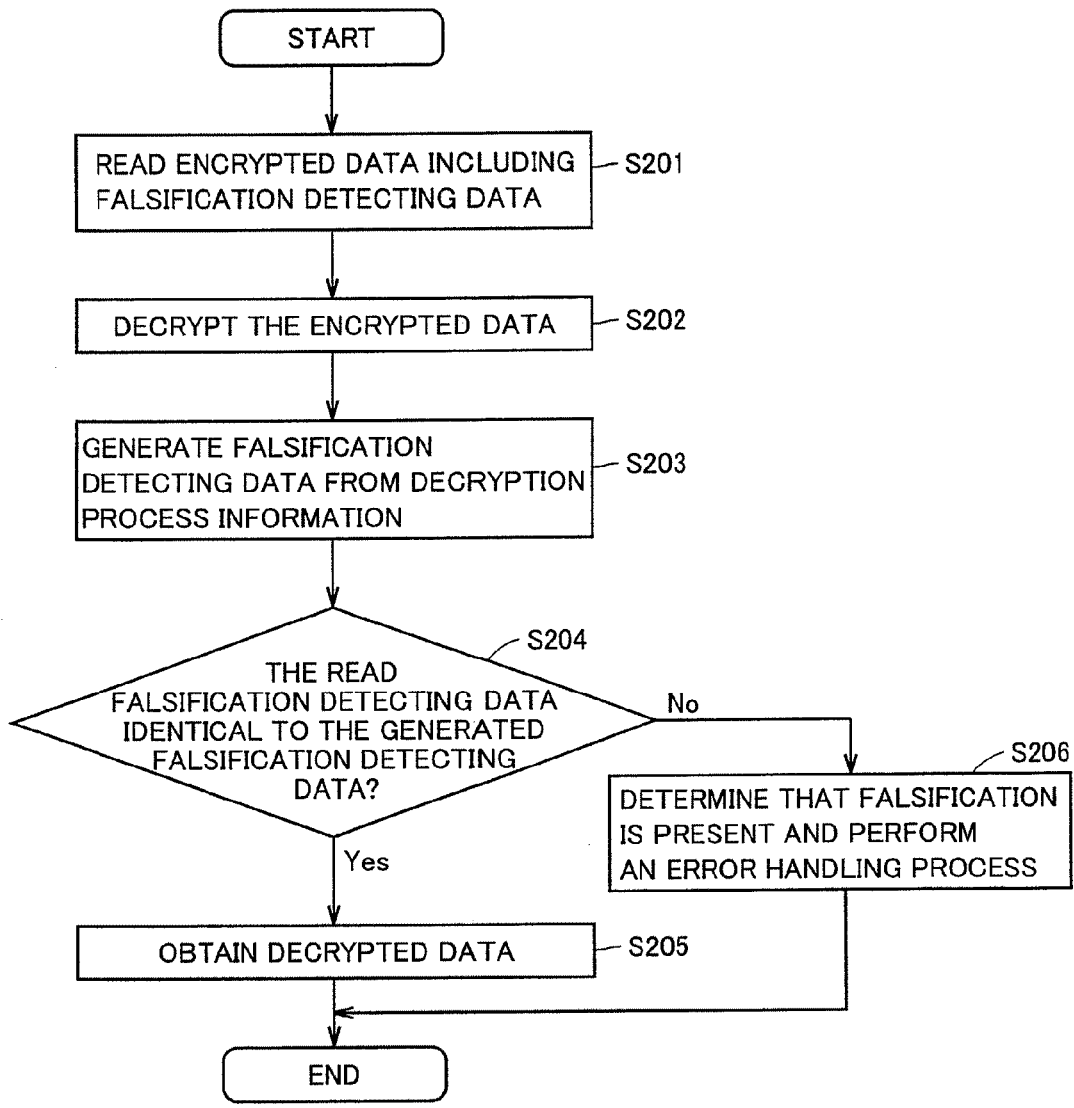
FIG. 2 is a flow chart of a decryption process in the first embodiment.

FIG. 2 shows a procedure of a decryption process. This procedure employs a decryption algorithm corresponding to the encryption algorithm described above.

The decryption process is basically a reverse version of the encryption process. With reference to FIG. 2, encrypted data generated as described above is initially read (S201). As the decryption process is also performed in such an information process apparatus as described above, the encrypted data can also be obtained, as has been described above for data to be encrypted, for example from a CD-ROM or a similar recording medium, a hard disk internal to an information processing apparatus, a server via a network.

The obtained encrypted data is then decrypted in accordance with the decryption algorithm (S202). Once the encrypted data has completely been decrypted, decryption process information corresponding to the encryption process information calculated in the encryption process can be detected. The detected decryption process information is used in a manner similar to that used in the encryption process to generate falsification detecting data (S203).

Whether the falsification detecting data generated at S203 and that read at S201 match is determined (S204). If they match, the encrypted data, or the data to be encrypted that is indicated by the encrypted data, is not falsified data and the decrypted data is obtained (S205). If the falsification detecting data fail to match, the encrypted data, or the data to be encrypted indicated by the encrypted data, has been falsified and a prescribed error process is accordingly performed (S206).

Reference will now be made to describe more specifically the procedure of the above described encryption and decryption processes.

Figure 3:
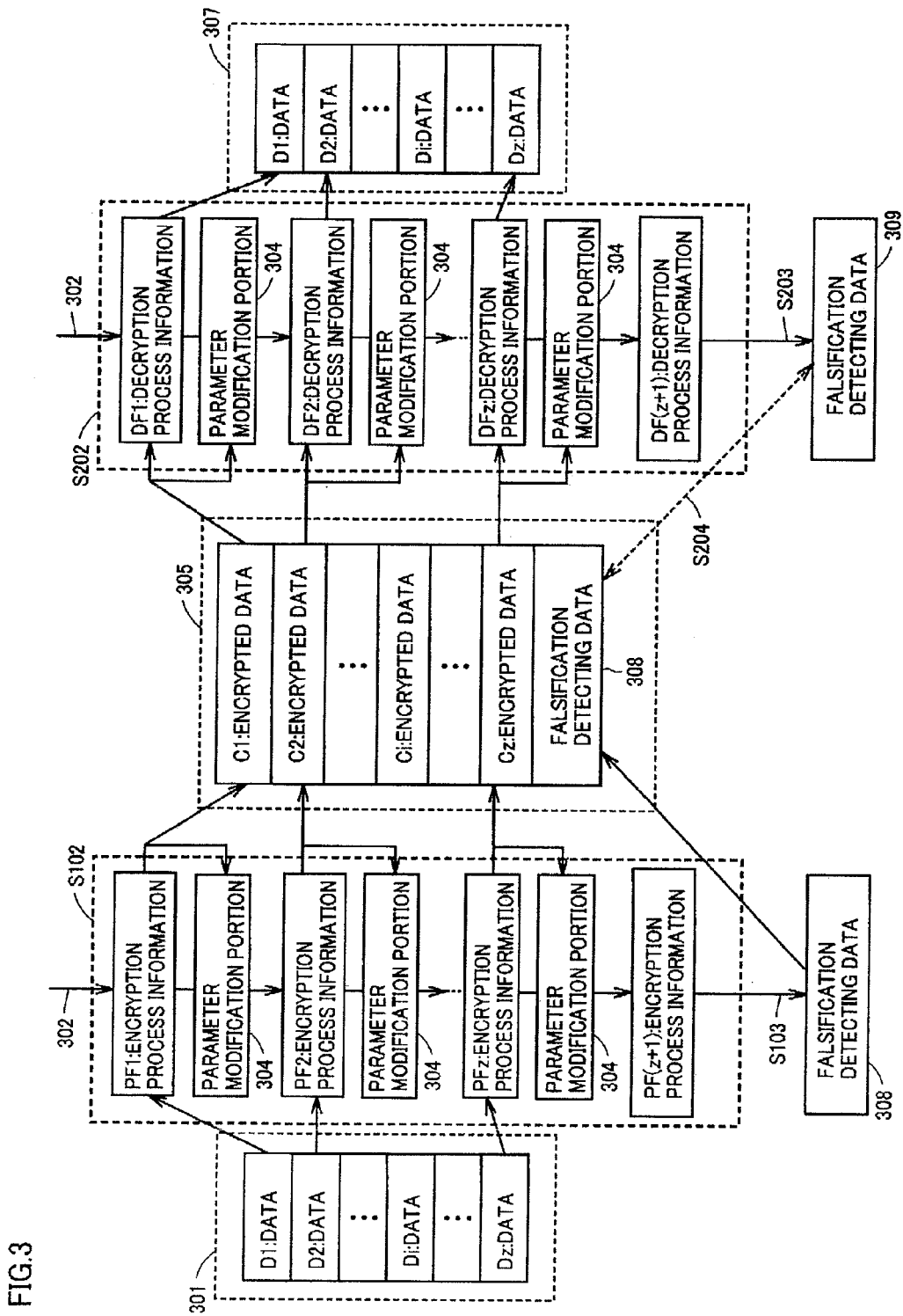
FIG. 3 schematically shows a flow of data in the encryption and decryption processes of the first embodiment.

FIG. 3 schematically shows a flow of data in a process in which data to be encrypted is encrypted and then decrypted to obtain the original data (the data to be encrypted).

Initially with reference to FIG. 3 an encryption step (S102) will be described. Data to be encrypted 301 has each unit of data of a predetermined, prescribed size encrypted in accordance with an encryption algorithm. In this example, the data to be encrypted 301 has each data Di sequentially encrypted, wherein i=1, 2, 3, . . . , z.

In the encryption step (S102), the data to be encrypted 301 has data Di extracted and encrypted in accordance with a prescribed encryption algorithm to generate encrypted data Ci, wherein i=1, 2, 3, . . . , z. In doing so, data Di is converted with reference to encryption process information PFj, wherein j=1, 2, 3, . . . , z, z+1. Note that data D1 is converted with reference to encryption process information PF1 initialized by an encryption key 302 prior to the encryption process. How encryption process information PF1 is calculated from encryption key 302, and the process for converting data Di to encrypted data Ci are previously determined by the encryption algorithm used. One example of the encryption algorithm will now be described with reference to FIG. 4A.

Figure 4A:
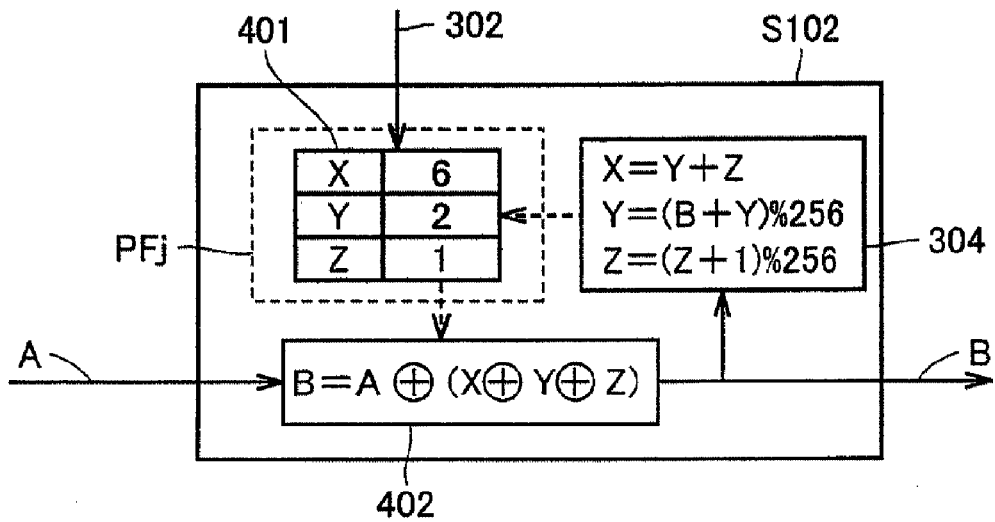
FIGS. 4A and 4B are schematic diagrams for illustrating the encryption and decryption processes of the first embodiment specifically by way of example.

FIG. 4A shows a procedure of an encryption process used in FIG. 3 when data Di is encrypted to generate encrypted data Ci. In FIG. 4A, input data A represents in FIG. 3 data Di to be encrypted and output data B represents in FIG. 3 encrypted data Ci. This encryption process includes an internal conversion parameter 401 corresponding to encryption process information PFj, a conversion portion 402 and a parameter modification portion 304. Internal conversion parameter 401 has parameters X, Y and Z, and are initialized by encryption key 302 of an initial value K before the encryption process is executed. Herein, as an initial state, parameter X=6, parameter Y=2 and parameter Z=1 are assumed. Conversion portion 402 uses data Di (input data A) and internal conversion parameter 401 (parameters X, Y and Z) to perform a prescribed operation to calculate encrypted data Ci (output data B).

More specifically, when input data A is received, output data B is calculated in accordance with the prescribed expression shown in conversion portion 402. Note that in the expression, the symbol indicated by a circled plus sign means an exclusive disjunction. In other words, output data B is calculated from input data A and internal conversion parameter 401 (parameters X, Y and Z). The operation's result or output data B is output as encrypted data Ci and also input to parameter modification portion 304. Parameter modification portion 304 receives and uses encrypted data Ci in accordance with the shown, prescribed conversion expression to update parameters X, Y and Z in value.

Parameter modification portion 304 will be described more specifically. For example, if in FIG. 4A input data A is 1, conversion portion 402 performs the prescribed operation and output data B is four. Output data B (=4) is input to parameter modification portion 304 and an operation is performed for parameters X, Y and Z. As a result of the operation, the parameters X, Y and Z values are updated to 3, 6 and 2, respectively. The parameters X, Y and Z values updated are used as internal conversion parameter 401 in encrypting data D2 subsequent to data D1 of the data to be encrypted 301. Thereafter until final data Dz of data to be encrypted 301 is reached a similar process repeats for each data Di.

The data to be encrypted 301 has each data Di sequentially encrypted as described above to generate encrypted data Ci. Then in the step of obtaining falsification detecting data (S103), encryption process information PF (z+1), which corresponds to a final internal conversion parameter 401, is obtained as falsification detecting data 308. The falsification detecting data 308 obtained is attached to encrypted data C1-Cz to complete encrypted data 305. The encryption process thus ends.

Decryption step 202 shown in FIG. 3 will now be described. When encrypted data 305 is obtained, a decryption algorithm corresponding to the encryption algorithm is used to perform a decryption process by the same unit of data as applied in the encryption process. In decryption step 202, encrypted data 305 has encrypted data Ci extracted and converted with reference to decryption process information DFj to original data Di, wherein j=1, 2, . . . z, z+1. As a result, decrypted data 307 of data D1-Dz is generated. Prior to the decryption process, decryption process information DF1 is initialized by encryption key 302 identical to that employed in the encryption process. One example of the decryption process is shown in FIG. 4B.

Note that encryption key 302 used in the decryption process may be informed previously by a user transmitting encrypted data 305. Alternatively, the key may be included in a portion of encrypted data 305 and transmitted at the same time as encrypted data 305 is transmitted. Herein, encryption key 302 employed in the decryption process may be obtained through any procedures.

Figure 4B:
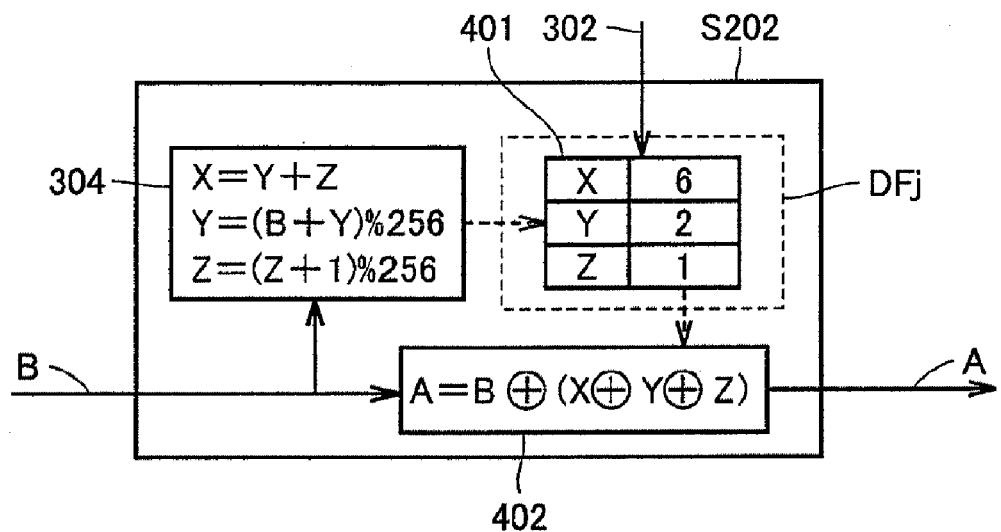

FIG. 4B shows a procedure of a decryption process decrypting the FIG. 3 encrypted data Ci to generate data Di as decrypted data 307. In FIG. 4B, input data B represents in FIG. 3 encrypted data Ci and output data A represents in FIG. 3 data Di of decrypted data 307. This decryption process is, as shown in FIGS. 4A and 4B, similar to the encryption process, including internal conversion parameter 401 corresponding to decryption process information DFj, conversion portion 402 and parameter modification portion 304, performing an operation corresponding to a reverse version of the encryption process. Internal conversion parameter 401 has parameters X, Y and Z, and these parameters have their values initialized prior to the decryption process by encryption key 302 of initial value K. Herein, as well as in the encryption process, parameters X, Y and Z are initialized in value to be 6, 2 and 1, respectively. Conversion portion 402 uses encrypted data Ci (input data B) and internal conversion parameter 401 (parameters X, Y and Z) to perform a prescribed operation to decrypt encrypted data Ci to provide data Di (output data A). In other words, output data A is calculated from input data B and internal conversion parameter 401 (parameters X, Y and Z). Input data B is input to conversion portion 402 as well as parameter modification portion 304. Parameter modification portion 304 follows received input data B and the shown, prescribed conversion expression to update the internal conversion parameter 401 (parameters X, Y and Z) in value.

Herein, if data D1 to be encrypted has a value of 1, then encrypted data C1 has a value of 4. Accordingly in FIG. 4B data B of 4 is input and conversion portion 402 performs an operation thereon and outputs data A of 1, which is the same value as the original data D1. When encrypted data 305 is thus free of falsification, encryption process information PFj and decryption process information DFj are equal. Accordingly, if the data to be encrypted 301 has each unit of data, or data D1-Dz, with partial data Di falsified, then the encryption process information and decryption process information corresponding to data Di do not match, and encryption and decryption process information PFj and DFj can be used as falsification detecting data 308 and 309, respectively.

Furthermore, data B (having the value of 4) is input to parameter modification portion 304 and internal conversion parameter 401 (parameters Z, Y and Z) is operated and updated in value to 3, 6 and 2, respectively. The parameters having the updated values are used as internal conversion parameter 401 in decrypting data C2. Thereafter until data Cz is reached the decryption process similarly repeats.

For encryption data C1 to Cz the above described decryption process is performed to generate data D1-Dz of decrypted data 307. Then at S203 final decryption process information DF (z+1) is obtained (or generated) as falsification detecting data 309 and at S204 a decision is made as to whether falsification detecting data 308 attached to encrypted data 304 and the obtained falsification detecting data 309 match. If the data match, a decision is made that encrypted data 305, or the data to be encrypted 301 is normally received free of falsification. Otherwise, a decision is made that the data has been falsified.

Another Example of Internal Conversion Parameter

For falsification detecting data 308 as described above, the three values of parameters X, Y and Z of internal conversion parameter 401 are exactly used, and step 103 of generating falsification detecting data, as shown in FIG. 1 does not effect any step. If a different type of encryption process is applied, however, then a large amount of data may be processed in connection with internal conversion parameter 401. In that case, the amount of data attached in connection with encoded data 305 would not be ignored. In that case, in the step of generating falsification detected data (S103) a message digest (MD) can be obtained from final internal conversion parameter 401 and attached as falsification detecting data to encrypted data 305 (S104).

Figure 5:
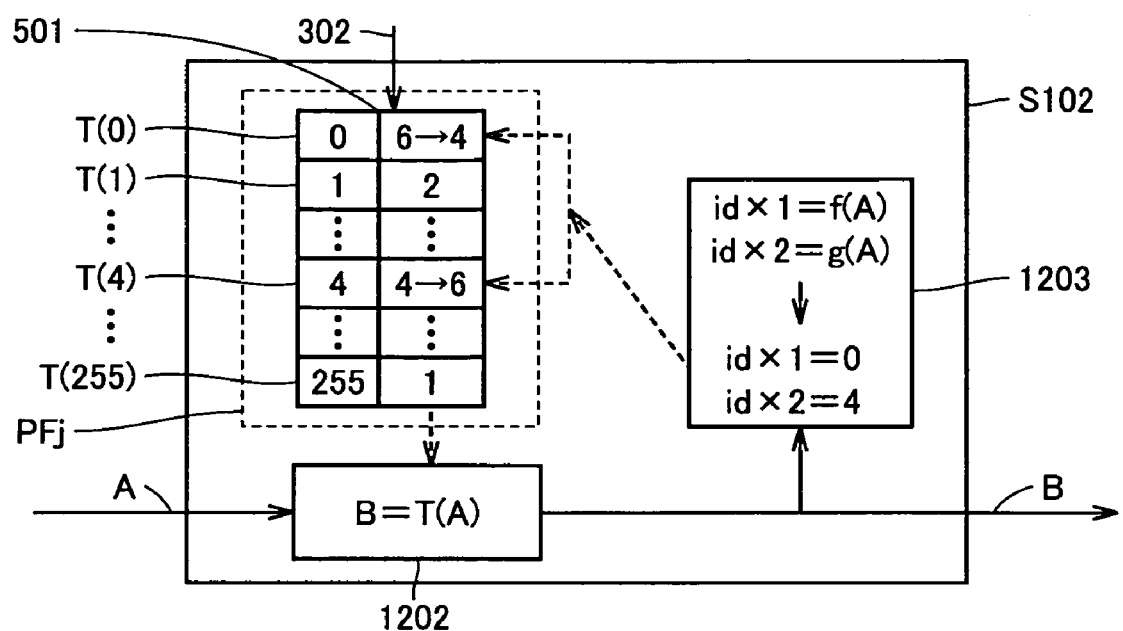
FIG. 5 is a diagram for illustrating the encryption process of the first embodiment specifically by way of example.

FIG. 5 shows an encryption step different from that as has been described previously. Herein, the corresponding decryption process is not shown as its configuration is a reverse version of the encryption process. The FIG. 5 encryption system has an internal conversion parameter 501 corresponding to encryption process information PFj, a conversion portion 1202 and a parameter conversion portion 1203. In the FIG. 5 system, the data to be encrypted 301 received as data A is sequentially converted, as predetermined, to encrypted data 305 and output as data B. In this example, internal conversion parameter 501 has 256 conversion tables T(0), T(1), ..., T(255). Conversion portion 1202 uses conversion tables T(0) to T(255) to convert the data to be encrypted 301 by the byte to encrypted data 305. Parameter modification portion 1203 uses information of output encrypted data 305 to update conversion tables T(0) to T(255) in content (or value).

Prior to the encryption process, the internal conversion parameter 501 content is initialized by encryption key 302 of initial value K.

For example, as shown in FIG. 5, if conversion table T(0) has a value of 6, conversion, table T(1) has a value of 2, ..., and input data A is 0, then output data B is 6, and if data A is 1 then output data B is 6, and if data A is 1 then output data B is 2. Parameter modification portion 1203 obtains two values "idx1" and "idx2" to be exchanged from received output data B and specific functions "f" and "g" and exchanges tables T(idx1) and T(idx2) in value. For example, as shown in FIG. 5, "idx1"=0 and "idx2"=4, and tables T(0) and T(4) are exchanged in value. As a result, table T(0) has a value updated from 6 to 4 and similarly table T(4) has a value updated from 4 to 6.

Although not shown herein, the decryption process has as an internal conversion parameter a table performing a conversion corresponding to an inverted version of that of the encryption process and updates the table's content sequentially while performing a conversion process corresponding to an inverted version of that of the encryption process.

For FIG. 5, internal conversion parameters 501 corresponds to the size of 256 data, which is too large a size to be used as falsification detected data 308. Accordingly, internal conversion parameter 501 is converted to provide a reduced amount of data. This is done for example by using a hash function such as MD5 (Message Digest 5), Secure hash Algorithm 1 (SHA-1) and the like generating a specific number of bytes of data from a large amount of data, although it is not limited thereto. Alternatively, the hash function may not be used and internal conversion parameter 501 may simply have a portion provided as converted data. If internal conversion parameter 501 is used as falsification detecting data 308, such a conversion process can reduce falsification detecting data 308 in amount.

Furthermore, the decryption process can also use the approach used at step 103 of generating falsification detecting data to obtain the same result. Accordingly, by comparing the falsification detecting data attached to encrypted data and that obtained in the decryption process, a decision can be made as to whether the data to be encrypted 301, or encrypted data 305, has been falsified.

Thus falsification detecting data 308 is reduced in size by performing a process using a hash function for internal conversion parameter 501. In general, as compared with the data to be encrypted 301, internal conversion parameter 501 has a significantly small amount of data, and using a hash function to effect a conversion process, as described above, does not result in reduced overall process efficiency.

Second Embodiment

In the first embodiment, encryption process information PF (z+1) and decryption process information DF (z+1) obtained when data to be encrypted 301 is completely encrypted (S102) and decrypted (S202) are used to generate falsification detecting data 308 and 309. In the present embodiment, the data to be encrypted 301 is divided into a plurality of blocks and encryption process information obtained when each block is completely encrypted and decryption process information obtained when each block is completely decrypted are used to generate falsification detecting data.

Figure 6:
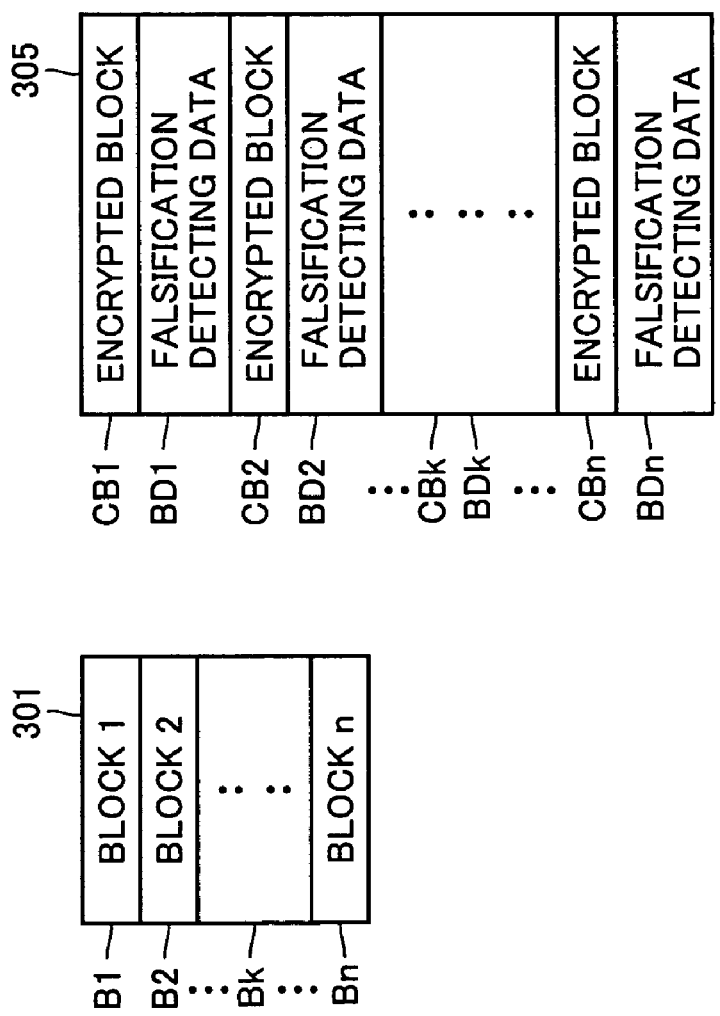
FIGS. 6A, 6B and 6C show a data structure according to a second embodiment by way of example.

FIG. 6A shows the data to be encrypted 301 divided into n blocks Bk, wherein k=1, 2, 3, ..., n. Block Bk may have data of a size determined by the memory capacities, processing capabilities and the like of the processing apparatuses sending and receiving the data to be encrypted 301, although desirably it is an integral multiple of the unit of the encryption process used. For example, DES allows encryption in units of 64 bits and accordingly block Bk has a size of an integral multiple of 64 bits. If encaption is provided by the bit, block Bk may have any size.

FIG. 6B shows a data structure of encrypted data 305 obtained after the data to be encrypted 301 shown in FIG. 6A is encrypted. As shown in FIG. 6B, encrypted data 305 is formed of an encrypted block CBk and falsification detecting data BDk, wherein k=1, 2, 3, ..., n, and there is a one-to-one correspondence between encrypted block CBk and falsification detecting data BDk. Falsification detecting data BDk is generated whenever block Bk is completely encrypted, and data BDk is attached to follow encrypted block CBk corresponding thereto. More specifically, encrypted CBk and falsification detecting data BDk calculated for the data of block CBk are recorded for each block Bk alternately. In the present embodiment the data to be encrypted 305 may have a structure other than described above. For example, as shown in FIG. 6C, the encrypted block CB1-CBn data and falsification detecting data BD1-BDn may be recorded at different locations, respectively.

Figure 7:
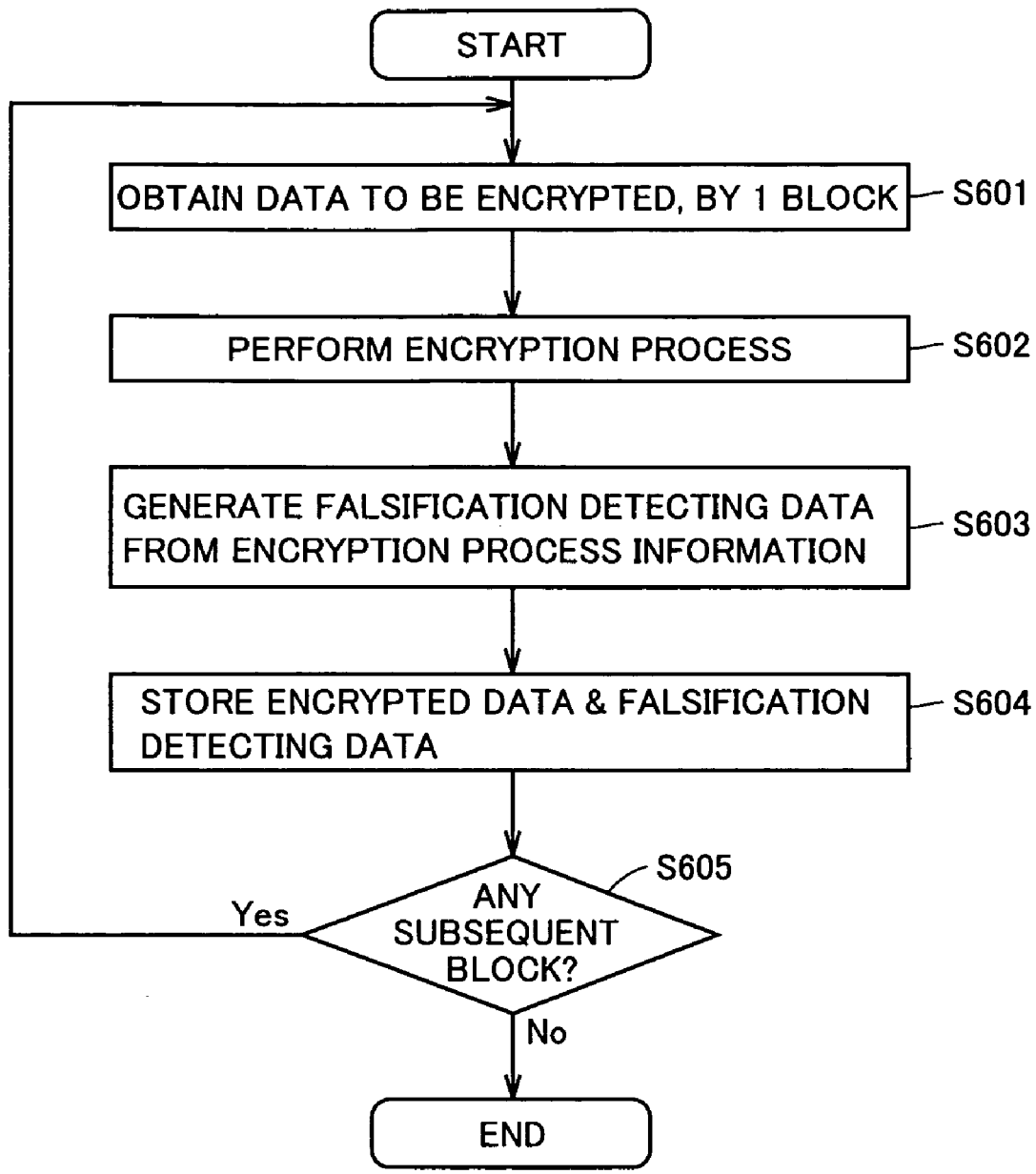
FIG. 7 is a flow chart of an encryption process in the second embodiment.
Figure 8:
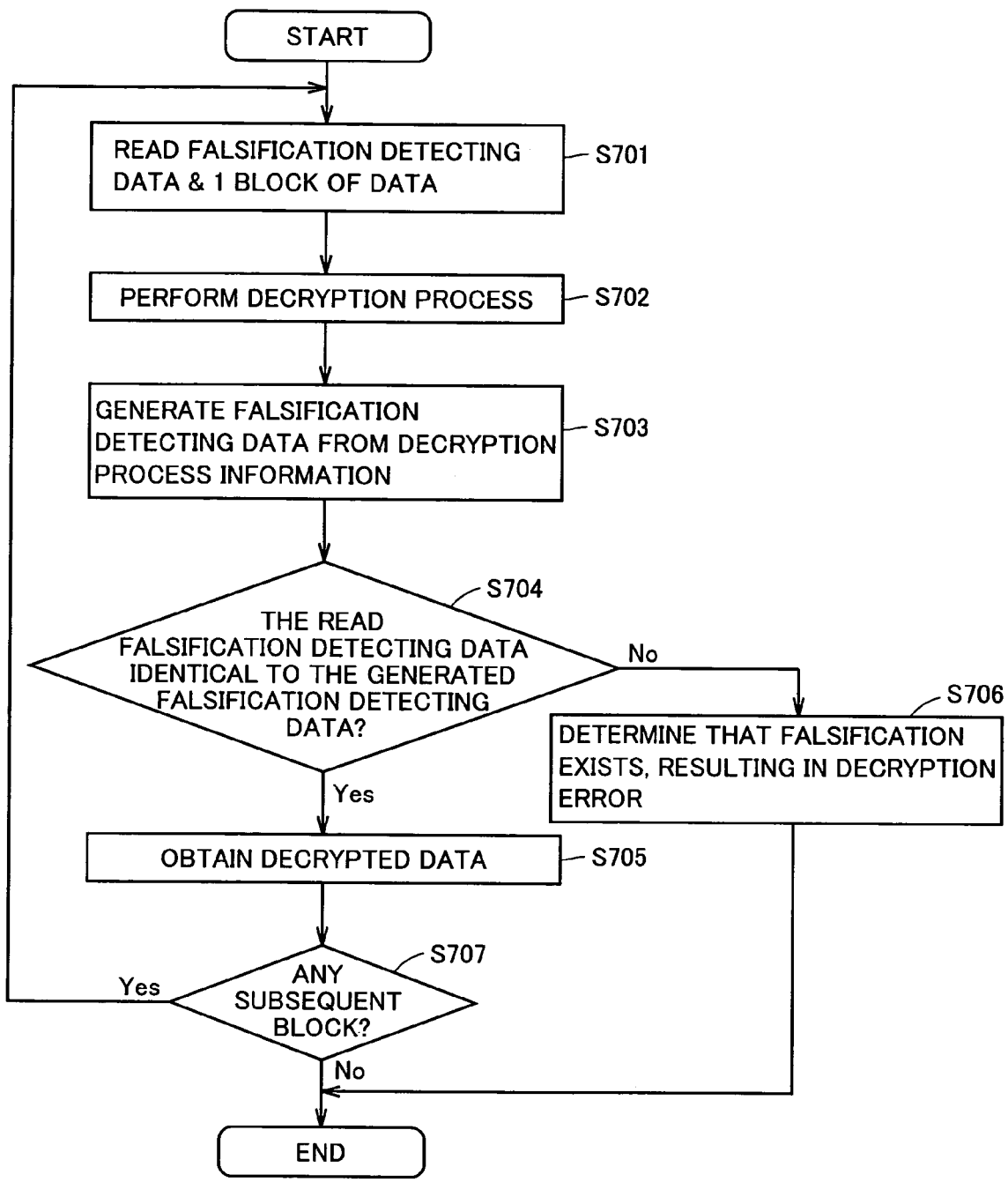
FIG. 8 is a flow chart of a decryption process in the second embodiment.

In accordance with the present embodiment encryption and decryption processes proceed as shown in FIGS. 7 and 8, respectively. Any steps similar to those in the first embodiment will not be described.

In the encryption process, as shown in FIG. 7, initially from the data to be encrypted 305 the data of a single block Bk of a predetermined size is obtained (S601) and encrypted (S602). When the block Bk data is completely encrypted, encryption process information PFk is obtained, and this information is used to generate falsification detecting data BDk (S603) and encrypted block CBk and falsification detecting data BDk are stored to provide the data structure as shown in FIG. 6B or 6C (S604). This series of steps is repeated for all blocks Bk of the data to be encrypted 305 (S605). Encrypted data 305 is thus obtained (or generated).

In the decryption process, as shown in FIG. 8, falsification detecting data BDk of encrypted data thus obtained and encrypted block CBk corresponding thereto are initially read (S701) and the decryption process is effected (S702). Then decryption process information DFk is used to generate falsification detecting data (S703) and a decision is made as to whether the generated falsification detecting data and falsification detecting data BDk read at S701 match (S704). If they match, decrypted data is obtained (S705). Otherwise, a decision is made that encrypted data 305, or the data to be encrypted 301 that is indicated by encrypted data 305, has been falsified, and for the decryption process an error will result (S706). This series of steps is similarly repeated for all of encrypted blocks CBk (S707) to obtain decrypted data 307.

Thus dividing the data to be encrypted 301 into a plurality of blocks Bk and attaching falsification detecting data BDk to each block Bk allow falsification to be detected for each block Bk to locate a portion of data to be encrypted 301 that has been falsified. Other blocks Bk than that corresponding to the falsified portion of the data to be encrypted 301 can normally be decrypted. If for example a communication error occurs and results in the data to be encrypted 301 (encrypted data 305) being partially corrupted, the data can minimally be damaged.

Third Embodiment

As a specific application of each embodiment described above a third embodiment envisages a system distributing an electronic book's data (hereinafter referred to as "electronic book content").

Figure 9:
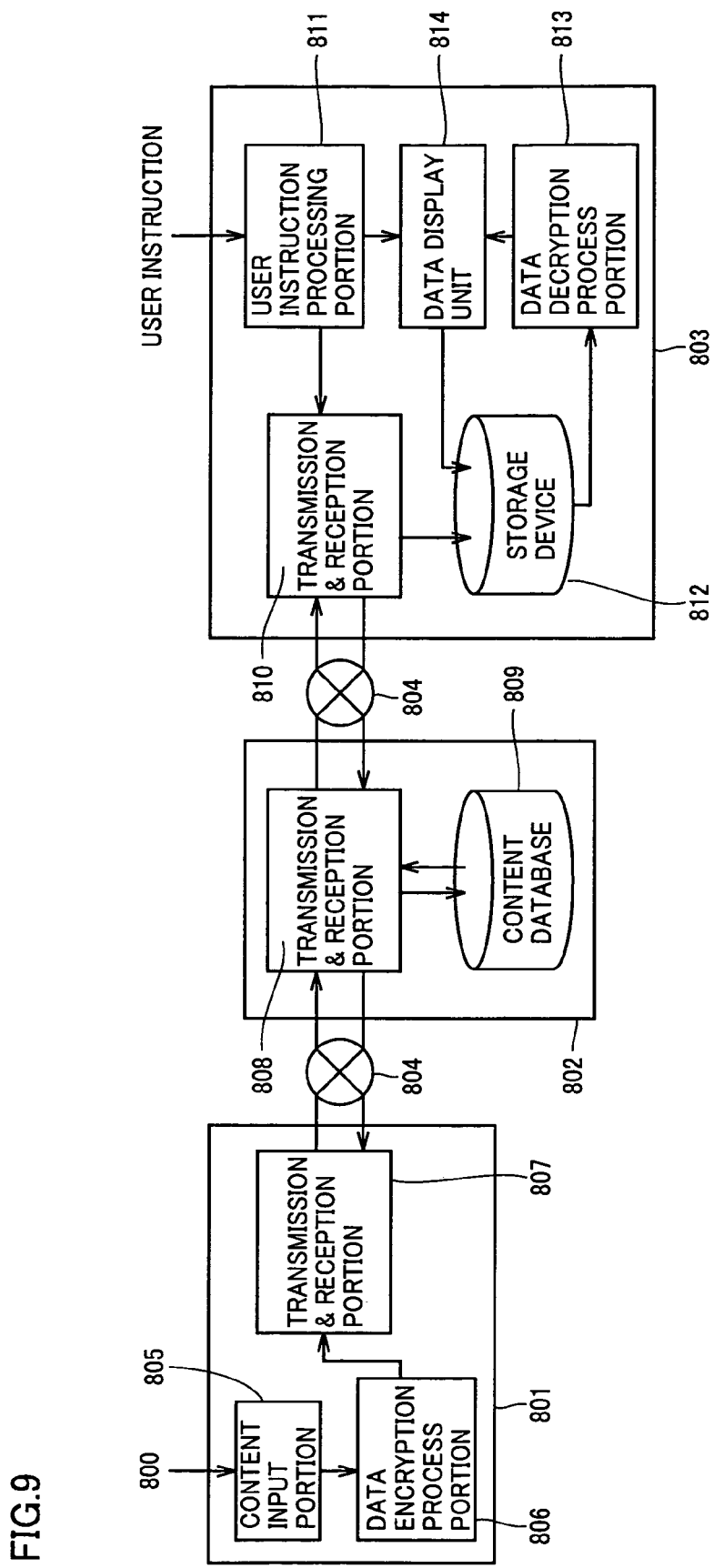
FIG. 9 is a diagram of a configuration of a distribution system in a third embodiment.

FIG. 9 shows an electronic book content distribution system. This system includes a content production device 801, a server device 802, a data display device 803, and a network 804 allowing devices 801 and 802 to communicate with each other and devices 802 and 803 to communicate with each other. Content production device 801 is configured of a general purpose personal computer to produce electronic book content. Content production device 801 includes a content input portion 805, a data encryption process portion effecting such an encryption process as has been described previously, and a transmission and reception portion 807. A content creator inputs electronic book content 800 via content input portion 805. The input electronic book content 800 is encrypted by encryption process portion 806 and the encrypted electronic book content 800 is transmitted by transmission and reception portion 807 via a network 804 to server device 802.

While herein electronic book content 800 is externally input to the content production device, a user may operate content input portion 805 to produce the content.

Figure 10A:
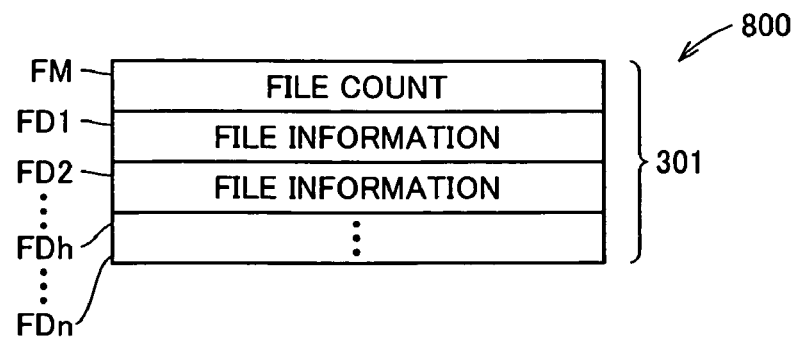
FIGS. 10A and 10B show by way of example a data structure of electronic book content in the third embodiment.
Figure 10B:
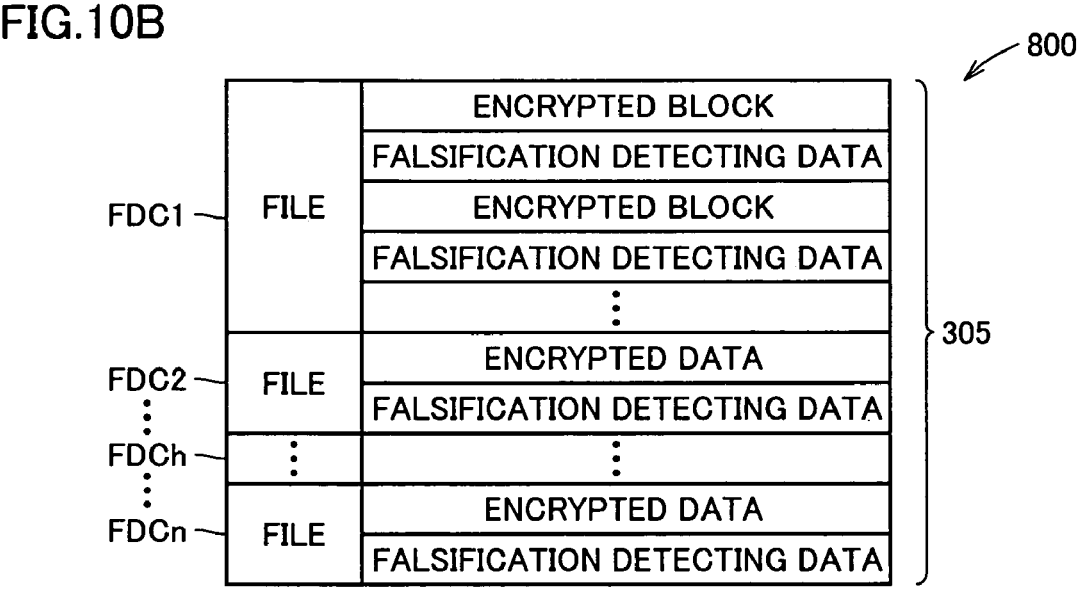

Electronic book content 800 has a data structure separated by way of example into the data to be encrypted 301 and encrypted data 305, as shown in FIGS. 10A and 10B. In general, electronic book content is often configured to contain a plurality of files including a text file describing a main text, an image file such as a diagram, a picture and a photograph, an audio file such as sound effect, and the like. In the present embodiment, electronic book content 800 corresponding to the data to be encrypted 301, as shown in FIG. 10A from the top, includes data FM indicating the number of files contained in electronic book content 800, and file information FDh of each file, wherein h=1, 2, 3, ..., n. Electronic book content 800 corresponding to encrypted data 305, as shown in FIG. 10B, includes file data FDCh corresponding to respective file information FDh and obtained by encrypting content of file information FDh, wherein h=1, 2, 3, ..., n. For example, if electronic book content 800 contains the three files of a text file, an image file and an audio file, file information FD1, FD2, and FD3 would include text data, image data and audio data, respectively. File information FDh includes information of the corresponding file, such as the file's name, an offset value related to data stored in the file, the size of the data stored in the file, and an encryption method and key applied.

File information FDh is encrypted by encryption process portion 806 in accordance with the method previously described in each embodiment. For file information FD1, the file of interest is divided into a plurality of blocks and encrypted by the block for conversion to file information FDC1. For file information FD2, the file of interest has its entirety subjected to encryption for conversion to file information FDC2. Whether to encrypt a file's data by the block or entirely may be determined by the type of the data. More specifically, if the data is text data, audio data or moving image (video) data, encrypting the data by the block allows the data to be randomly accessed and reproduced for decryption. This provides a shorter access time than when data is entirely decrypted. Furthermore, if the data is a still image or similar data that will not partially be accessed, the data may entirely be encrypted.

In FIG. 9, server device 802 is configured of a general purpose personal computer and includes a transmission and reception portion 808 and a content database 809. From content production device 801 electronic book content 800 encrypted is transmitted and received by transmission and reception portion 808. The received electronic content 800 is stored to content database 809. Data display device 803 issues via network 804 a request for transmission. The request is received by transmission and reception portion 808 and in response the encrypted content corresponding to the electronic book indicated by the received request is read from content database 809 and transmitted by transmission and reception portion 808 via network 804 to data display device 803.

Data display device 803 is configured of an information processing apparatus. Data display device 803 includes a transmission and reception portion 810 transmitting and receiving data via network 804, a user instruction processing portion 811 processing user instructions, storage device 812 storing electronic book content, a data decryption process portion 813 decrypting encrypted electronic book content, as has been described previously, and a display unit 814 displaying electronic book content on a screen.

A user selects via user instruction processing portion 811 desired electronic book content from a menu of electronic book contents displayed on a screen. In response, transmission and reception portion 810 transmits a request to server device 802 to transmit the selected content. Subsequently, server device 802 transmits encrypted electronic book content which is in turn received by transmission and reception portion 810 and stored to storage device 812. The encrypted electronic book contents stored to storage device 812 is decrypted by data decryption process portion 813 and the resultant, original electronic book content 800 is displayed by data display unit 814 on a screen. In doing so, if adaptation is made to decrypt only an amount of data that can be displayed at a time, data can be decrypted and displayed in a shorter period of time than when entire data is decrypted. More specifically, electronic book content encrypted by the block is decrypted by the number of blocks that corresponds to the size of a display buffer associated with data display unit 814. For electronic book content, typically a top page is initially displayed. Accordingly, electronic book content 800 is decrypted from the top by the number of blocks that corresponds to the size of the display buffer.

Furthermore, when user instructions are received via user instruction processing portion 811 for example to turn a page, output a voice or the like, data required for the instruction is obtained from storage device 812 and decrypted by data decryption process portion 813 and as the decryption is effected whether falsification is present is determined. If a decision is made that falsification is absent, data display unit 814 displays data or an audio output portion (not shown) outputs the voice. If a decision is made that the data is falsified data then the user may be notified accordingly to interrupt the current process.

While in the present embodiment electronic book content is encrypted and thus distributed, information other than electronic book content may be encrypted and distributed. For example, music data, motion picture data and programs may be encrypted and distributed.

Fourth Embodiment

Another specific application of the second embodiment will be described with reference to FIGS. 11 and 12. In the present embodiment a digital content distribution system is envisaged. This system is similar to that shown in FIG. 9 for the sake of illustration. In the present embodiment, digital content is not limited to electronic book content and may be music data, video data and the like.

Typically, digital content can be obtained through a network, and data transmitted and received through the network is not falsified by a third party for the sake of illustration. In other words, only data that can legitimately be obtained is transferred through the network for the sake of illustration. However, data communicated through a network can be lost due to a communication error or the like. In such a case, the legitimately obtained digital content cannot be reproduced. To reproduce the digital content, all of the data of digital content must again be accessed and obtained. In the present embodiment will be described a procedure to handle a case in which data is lost while it is being communicated on a network.

Figure 11:
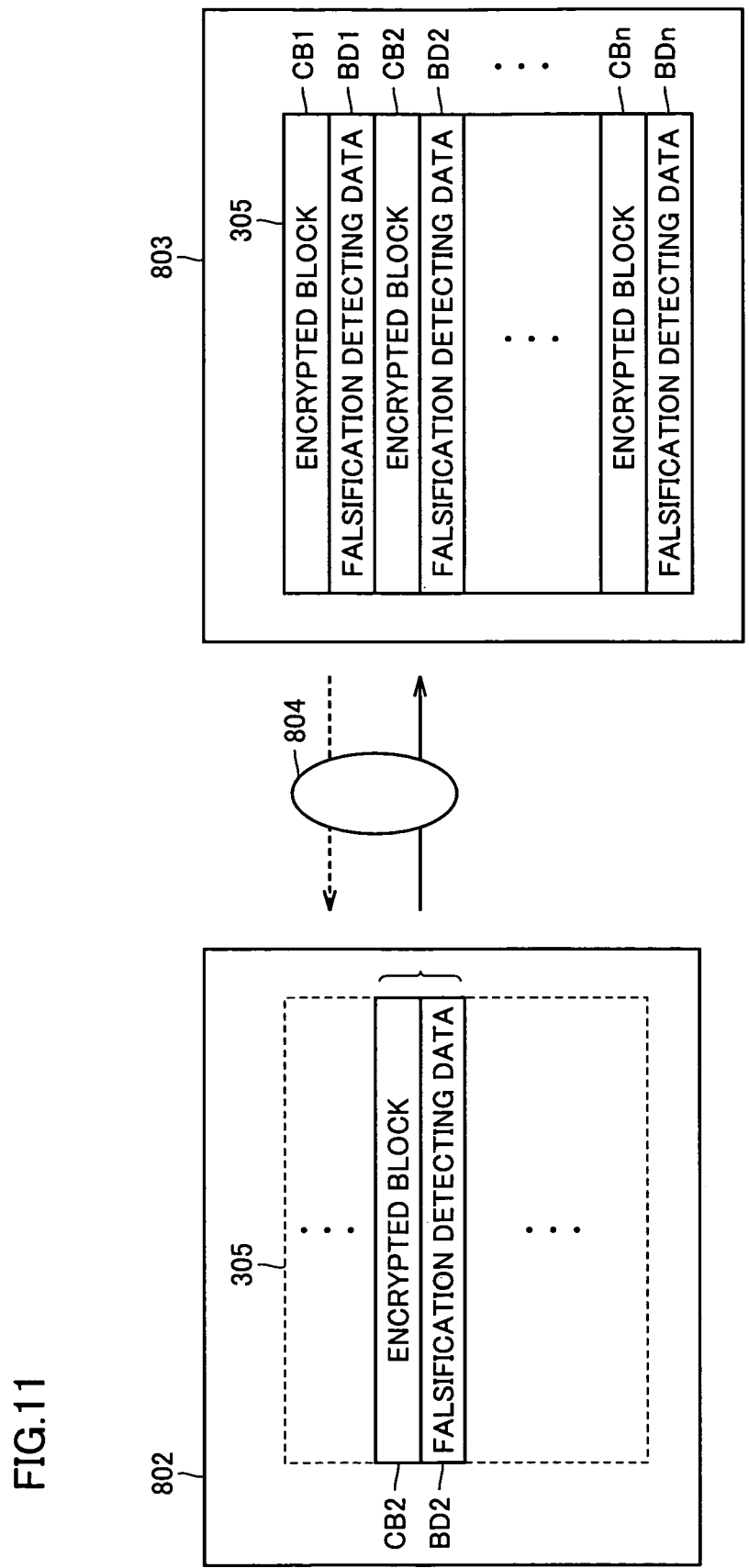
FIG. 11 is a schematic diagram representing a flow of data in a decryption process in a fourth embodiment.
Figure 12:
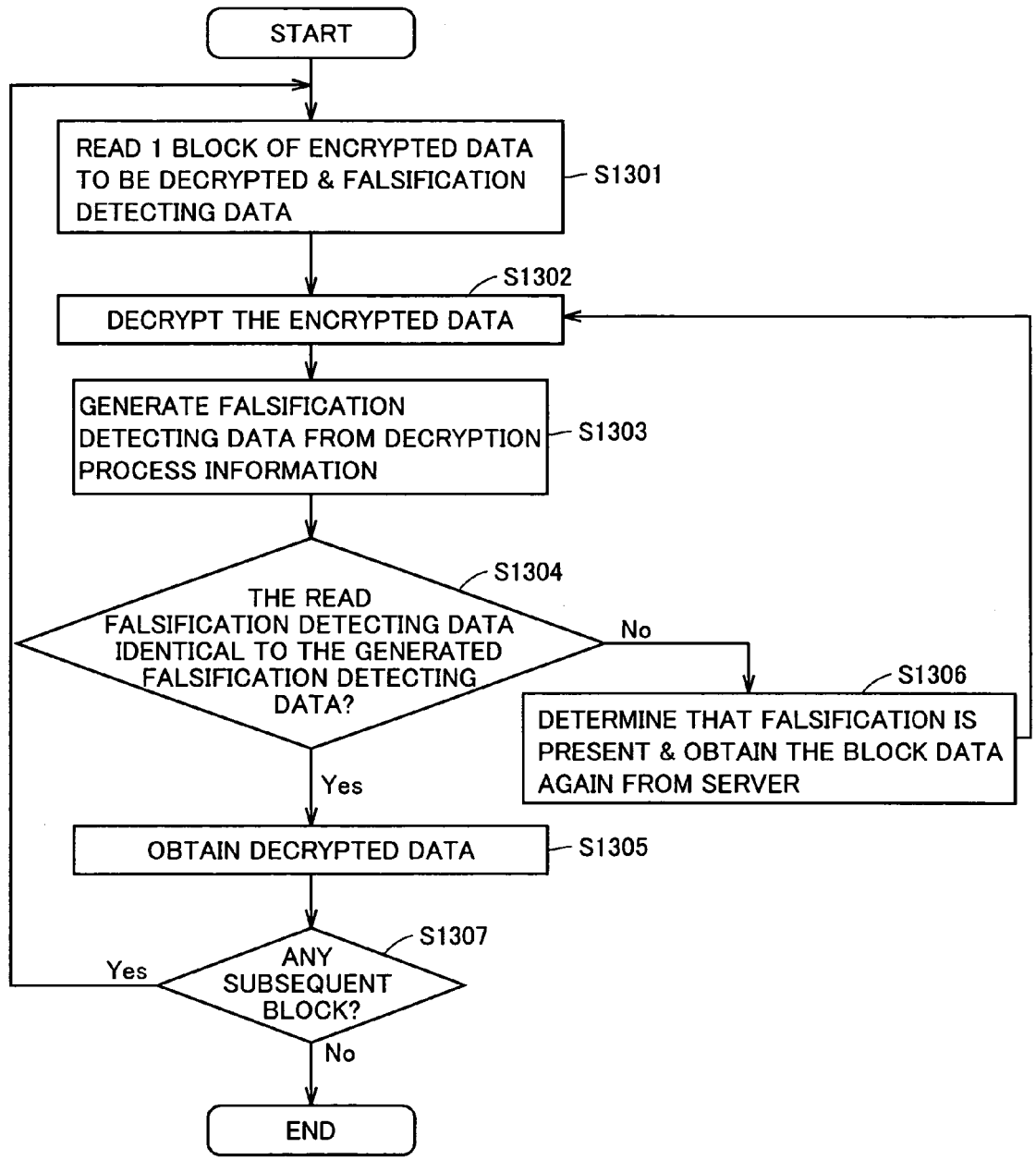
FIG. 12 is a flow chart of a decryption process in the fourth embodiment.

FIG. 11 schematically shows data in the FIG. 9 server device 802 and data display device 803. More specifically, the figure shows that digital content corresponding to encrypted data 305 stored in server device 802 at content database 809 is transmitted on network 804 to data display device 803 and stored to storage device 812. Encrypted data 305 corresponding to the digital content has a structure divided for each encrypted block CBk and falsification detecting data BDk corresponding thereto, as has been described in the second embodiment. Of encrypted data 305 corresponding to digital content stored in data display device 805 at storage device 812, encrypted block CB2 has data falsified for example by a communication error for the sake of illustration.

When data display device 803 operates to allow reproduction (or decryption), falsification is detected in encrypted block CB2 by the corresponding falsification detecting data BD2. In response, data display device 803 notifies server device 802 that encrypted block CB2 is falsified. Server device 802 responsively retransmits encrypted block CB2 and falsification detecting data BD2 alone to data display device 803. Data display device 803 having received these retransmitted data can provide reproduction. It should be noted that only a portion of entire content (or entire encrypted data 305) is retransmitted from server device 802 to data display device 803. If falsification is detected and again legitimate data is to be communicated and thus obtained, it can be communicated in a reduced period of time.

The FIG. 11 procedure in connection with data display device 803 will be described with reference to the flow chart of FIG. 12. Digital content will now be decrypted and reproduced. More specifically, data display device 803 initially obtains a first encrypted block CB1 of encrypted data 305 and falsification detecting data BD1 (S1301). The obtained encrypted block CB1 is decrypted (S1302). This decryption is effected in a manner similar to that described in the second embodiment. Decryption process information is used to generate falsification detecting data (S1303). Falsification detecting data BD1 attached to encrypted block CB1 is compared with the falsification detected data generated at S1303 to determine if they match (S1304). If so, decrypted data is obtained (S1305) and whether a subsequent encrypted block exists is determined (S1307). If it does then the process returns to S1301. Otherwise, the process ends.

If a decision is made that the data fail to match, then a decision is made that encrypted block CB1, or block B1 indicated by encrypted data CB1, is falsified and encrypted block CB1 is again obtained from server device 802 through network 804 (S1306). Falsification attributed for example to a communication error on network 804 can thus be addressed.

Figure 13:
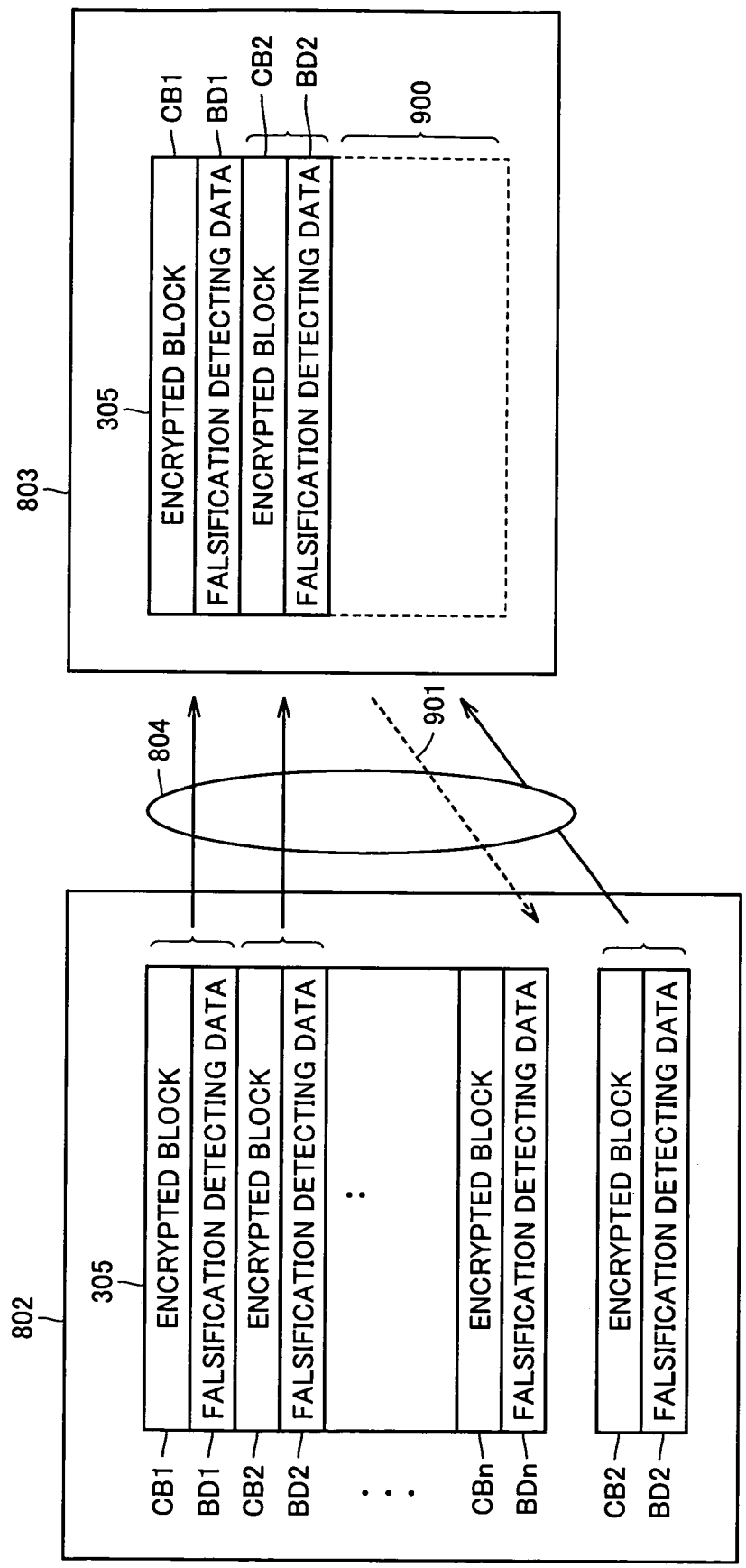
FIG. 13 is a schematic diagram representing a flow of data in the decryption process of the fourth embodiment.

While in FIG. 11, digital content is stored in data display device 803 at storage device 812, digital content can be received from network 804 and reproduced. For example, music, an image and the like are reproduced from the content's top sequentially. As such, if data's top portion exists, reproduction can be started. In other words, data is received through network 804, while it can be reproduced. FIG. 13 schematically shows data in server device 802 and data display device 803 in such a case.

FIG. 13 shows that digital content of encrypted data 305 stored in server device 802 at content database 809 is transmitted on network 804 to data display device 803. In FIG. 13, server device 802 has transferred only encrypted blocks CB1 and CB2 to data display device 803 and subsequent encrypted blocks are indicated by data to be obtained 900. In data display device 803 data decryption process portion 813 starts a decryption process. To do so, data are read sequentially from encrypted block CB1 and the read encrypted block CB1 data is subjected to decryption and detection of falsification. If the detection indicates that the data is not falsified, it is directly reproduced. If read encrypted block CB2 is falsified, data display device 803 outputs information 901 to server device 802 indicating that encrypted block CB2 is falsified, and data display device 803 again receives and obtains encrypted block CB2 and the corresponding falsification detecting data BD2 from server device 802. Thereafter a subsequent block is similarly obtained and reproduced.

Such a procedure provides a reduced transfer time and through network 804 encrypted data 305 can be obtained, decrypted and reproduced continuously.

Fifth Embodiment

The encryption and decryption processes described above in each embodiment can partially or entirely be provided in the form of a program (a string of ordered instructions adapted to a process performed by a computer) or a hardware logic executing such a process.

If it is provided in the form of a program, the program can be installed in an information processing apparatus to effect a desired process. In doing so, the program may previously be recorded in a computer readable recording medium and provided. Alternatively, it can be downloaded and provided through a network from a server device to an information processing apparatus or may previously be installed in an information processing apparatus and provided.

Figure 14:
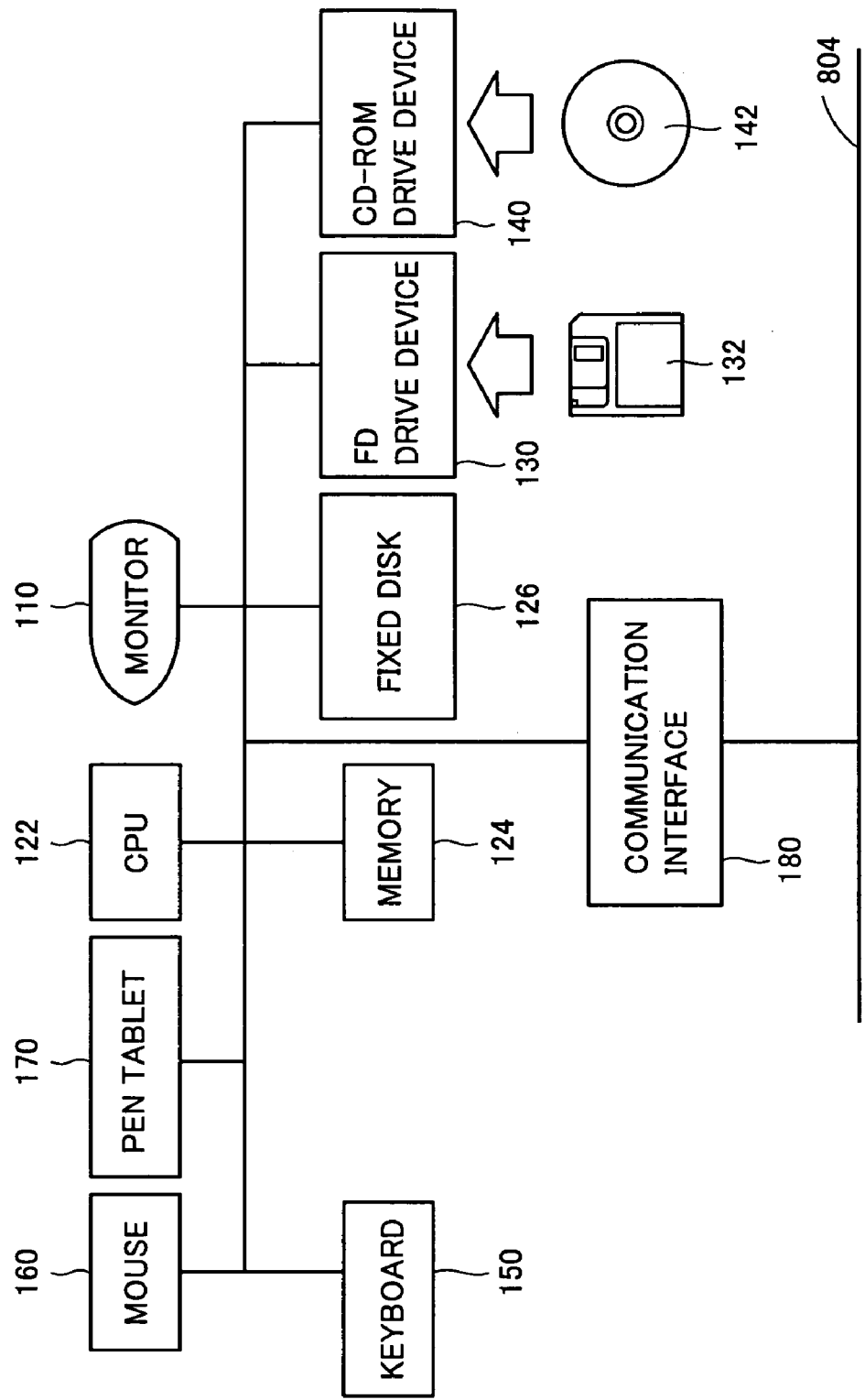
FIG. 14 shows a configuration of an information processing apparatus in a fifth embodiment.
Figure 15:
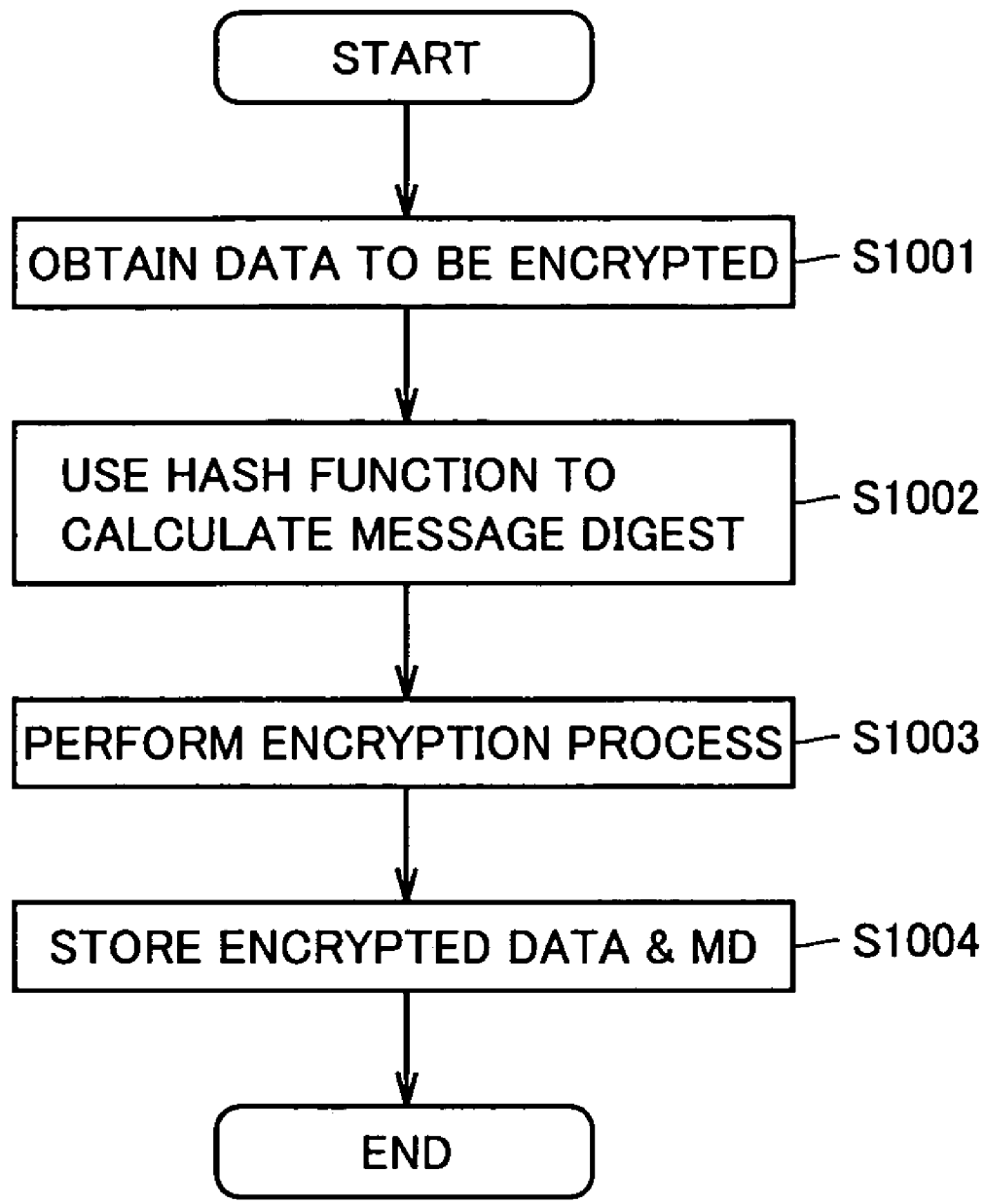
FIG. 15 is a flow chart of a conventional encryption process.
Figure 16:
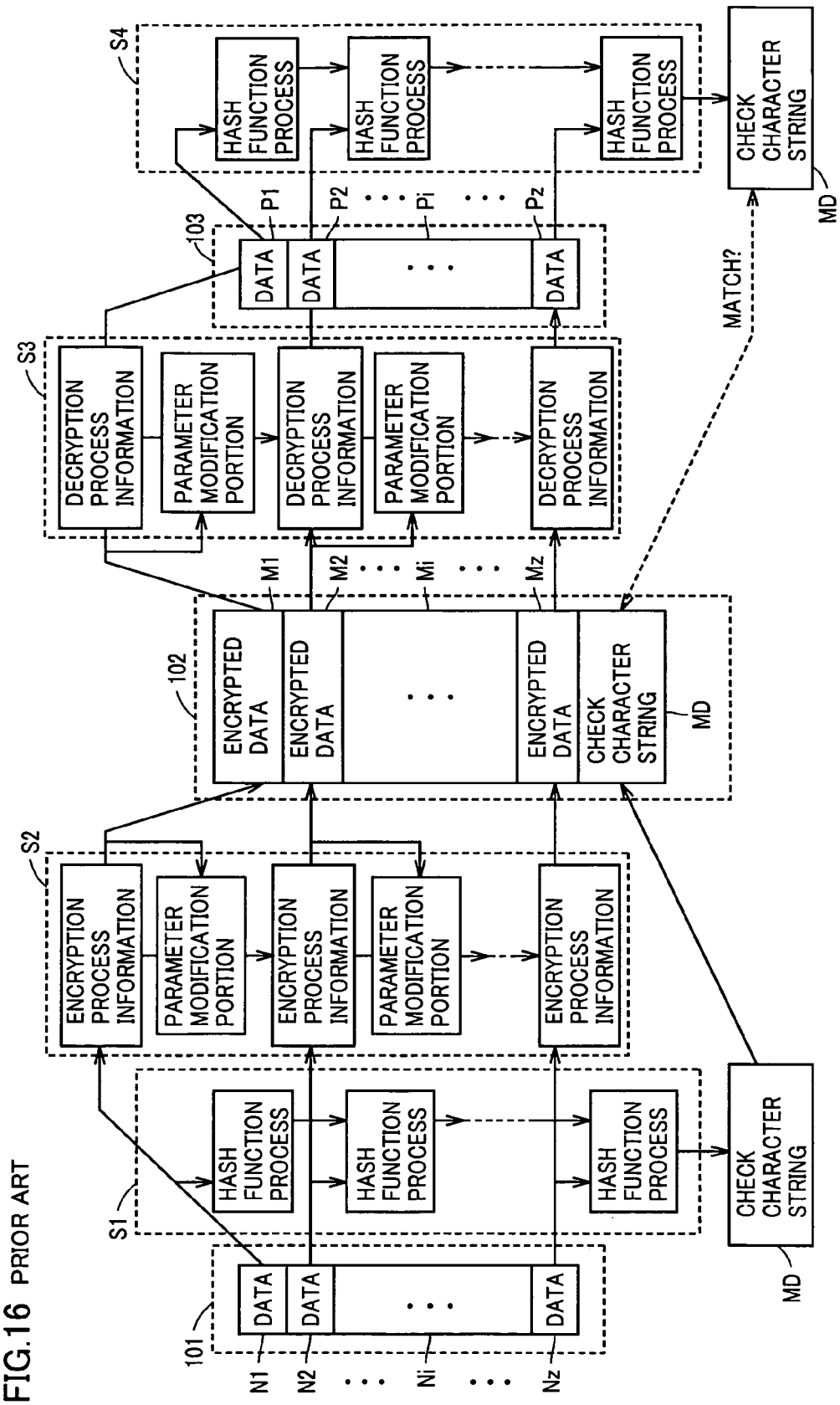
FIG. 16 is a schematic diagram for illustrating a flow of data in conventional encryption and decryption processes.

FIG. 14 shows a configuration of an information processing apparatus executing a program of the encryption or decryption process as described above in each embodiment. The FIG. 14 configuration corresponds to the FIG. 9 configuration of each of content production device 801, server device 802 and data display device 803. With reference to FIG. 14, the information processing apparatus includes a liquid crystal or cathode-ray tube (CRT) or the like monitor 110, a keyboard 150, a mouse 160, a central processing unit (CPU) 122, a memory 124 configured to include read only memory (ROM) or random access memory (RAM), a fixed disk 126, a flexible disc (FD) drive device 130 detachably receiving an FD 132 to access FD 231, a compact disk read only memory (CD-ROM) drive device 140 detachably receiving a CD-ROM 142 to access CD-ROM 142, and a communication interface 180 connecting the information processing apparatus to a network 804 to which a variety of networks such as the Internet are applied.

In the present embodiment, the above described recording medium may be a memory required for a process to be effected in the FIG. 14 information processing apparatus, such as memory 124 itself, or it may be a magnetic tape, FD 132 and CD-ROM 142 (not shown) or a recording medium readable when it is set in a magnetic tape device (not shown), FD drive device 130, CD-ROM drive device 140 or a similar program reading device. In any case, a program stored in a recording medium may be accessed and executed by CPU 122 or may once be read from the recording medium and loaded to a prescribed memory area of FIG. 14, e.g., a memory area of memory 124, and read and executed by CPU 122. This loading program is previously stored in the information processing apparatus of interest.

Note that the above described recording medium is a recording medium configured to be separable from the main body of the information processing apparatus and it may be a medium bearing a fixed program. For example, it may be magnetic tape, cassette tape or a similar type of tape, FD 132, fixed disc 126 or a similar magnetic disc or CD-ROM 142/ magnetic optical disc (MO)/mini disc (MD)/digital versatile disc (DVD) or a similar optical disc, an IC card, (including a memory card)/optical card or a similar card, or mask ROM, erasable and programmable ROM (EPROM), electrically EPROM (EEPROM), flash ROM or similar semiconductor memory.

Furthermore as in the present embodiment the information processing apparatus is connectable to network 804 the above described recording medium may be a recording medium receiving a program downloaded through network 804 to bear the program in flux. If the recording medium receives a program downloaded through network 804, a downloading program may previously be stored in the main body of the information processing apparatus or installed previously from another recording medium to the main body of the information processing apparatus.

Note that the recording medium may store content other than a program. For example it may store data.

Thus, as described in each embodiment, as an encryption process having a falsification detection function is effected a conversion parameter value can be generated and utilized as falsification detecting data to eliminate a process for calculating the falsification detecting data and reduce an amount involved in the encryption process. The decryption process can also similarly be reduced in amount. As a result, the encryption and decryption processes can be free from a significant load and thus rapidly be effected.

Furthermore, data to be encrypted can be processed by the block and each block a decision of whether falsification is present or absent can be made. As such, if data is falsified, the data of the data to be encrypted that falls within a falsified range (or block) can readily be located. Furthermore in that case the data other than the falsified block can normally be decrypted. Furthermore, for music, video, electronic book and other similar content having data reproduced in time series, only a required portion (or block) can first be decrypted, and reproduction can be started before all data are completely be decrypted.

Although the present invention has been described and illustrated in detail, it is clearly understood that the same is by way of illustration and example only and is not to be taken by way of limitation, the spirit and scope of the present invention being limited only by the terms of the appended claims.

The invention claimed is:

1. A method of encryption, performed by an encryption apparatus having a processing unit, comprising the steps of:
   encrypting data by an encryption process, performed by the processing unit, to generate ciphertext, modifying a parameter using said ciphertext further encrypting said data using said modified parameter as encryption process information to generate further ciphertext;
   attaching said encryption process information to said further ciphertext;

transmitting, by said encryption apparatus, said further ciphertext and said attached encryption process information in order to detect whether said further ciphertext is falsified data based on said encryption process information.

2. The method of claim 1, wherein the step of encrypting includes the steps of:
sequentially extracting portions of said data to be encrypted;
for each portion of said data in sequence, using a result of encrypting said portion previously extracted to calculate a result of encrypting said portion currently extracted, and using said sequentially calculated results of said encrypting to generate encrypted data; and
calculating said parameter based on a final of said sequentially calculated results after all portions of said data are encrypted.

3. The method of claim 1, wherein:
the step of encrypting includes the step of encrypting said data to be encrypted for each data block of a predetermined size to generate encrypted block data corresponding to said data block; and
the step of attaching includes the step of correlating data to said encrypted block data corresponding to each said data block, said correlated data is said parameter calculated during said encryption for each said data block.

4. The method of claim 1, wherein said encryption process information is a message digest corresponding to said parameter calculated during said encryption.

5. The method of claim 1, wherein said parameter calculated during said encryption is an entirety or a portion of an encryption parameter used in a common-key encryption system.

6. A method of detecting whether encrypted data is falsified, performed by a decryption apparatus having a processing unit, comprising the steps of:
said decryption apparatus receiving encrypted data;
decrypting, by said processing unit, said received encrypted data based on a decryption process to generate decrypted data, including modifying a parameter using said encrypted data, said modified parameter being decrypted data falsification detecting data for detecting whether said encrypted data is falsified data; and
said processing unit comparing said decrypted data falsification detecting data with encrypted data falsification detecting data previously attached to said encrypted data to detect from a resultant comparison whether said encrypted data is falsified data.

7. The method of claim 6, wherein said step of decrypting includes:
sequentially extracting portions of said encrypted data received at the step of receiving;
for each portion of said data in sequence, using a result of decrypting said portion previously extracted to calculate a result of decrypting said portion currently extracted, and using said sequentially calculated results of said decrypting to generate decrypted data; and
modifying said parameter based on a final of said sequentially calculated results after all portions of said data are decrypted.

8. The method of claim 6, wherein:
the step of decrypting includes the step of decrypting said encrypted data for each data block of a predetermined size to generate decrypted block data corresponding to said data block; and
the step of comparing includes the step of comparing said decrypted data falsification detecting data indicating said result of said decrypting corresponding to said decrypted block data calculated in generating said decrypted block data at the step of decrypting said encrypted data for each data block, with encrypted data falsification detecting data previously attached to said data block corresponding to said decrypted block data, and detecting from a resultant comparison whether said encrypted data is falsified data.

9. The method of claim 6, wherein said decryption process information is a message digest corresponding to said parameter calculated during said decryption.

10. The method of claim 6, wherein said parameter is an entirety or a portion of an encryption parameter used in a common-key encryption system.

11. A method of reproducing encrypted data, performed by an apparatus having a processing unit, comprising the steps of:
said processing unit sequentially extracting and decrypting portions of said encrypted data from prescribed ones of a plurality of blocks dividing said encrypted data;
said step of sequentially extracting and decrypting comprising, for each portion of said encrypted data in sequence, modifying a parameter for decrypting said encrypted data using a respective portion of said encrypted data, using a parameter determined based on said portion previously extracted to modify the parameter based on said portion currently extracted, and using said sequentially modified parameters of said decrypting to generate decrypted data from each said portion of said encrypted data, wherein a last said sequentially modified parameter is a final modified parameter after all portions of said encrypted data are decrypted; and
said processing unit comparing said final modified parameter with falsification detecting data previously correlated to said prescribed block for detecting whether said prescribed block is falsified, to determine from a resultant comparison whether to reproduce said decrypted data corresponding to said prescribed block.

12. The method of claim 11, further comprising the step of selecting from said plurality of blocks of said encrypted data one or more blocks corresponding to said prescribed blocks, respectively, wherein said encrypted data is data obtained by encrypting content to be reproduced and the step of selecting selects said one or more blocks corresponding to a data size corresponding to an amount of said content reproducible at a time.

13. The method of claim 11, wherein said final modified parameter is a message digest.

14. The method of claim 11, wherein said final modified parameter is an entirety or a portion of an encryption parameter used in a common-key encryption system.

15. The method of claim 11, further comprising the step of obtaining said encrypted data, wherein if in the step of comparing, a decision is made that said prescribed block is not reproduced, then in the step of obtaining, said encrypted data corresponding to said prescribed block is obtained.

16. A method of communicating encrypted data, performed by an apparatus having a processing unit, comprising the steps of:
said apparatus receiving encrypted data by means of communication, said encrypted data being previously divided into a plurality of blocks;
sequentially extracting and decrypting portions of said received encrypted data, by said processing unit, from prescribed ones of said plurality of blocks;
said step of extracting and decrypting comprising, for each portion of said encrypted data in sequence, modifying a parameter for decrypting said respective portion of said encrypted data using said respective portion of said encrypted data, using a previously modified parameter to modify the parameter based on said decrypting said portion currently extracted, and using said sequentially modified parameter to generate decrypted data from each said portion of said encrypted data, wherein a last said sequentially modified parameter is a final modified parameter after all portions of said encrypted data are decrypted; and said processing unit comparing said final modified parameter with falsification detecting data previously correlated to said prescribed block for detecting whether said prescribed block is falsified, to detect from a resultant comparison an error introduced in said communication of said encrypted data.

17. An encryption apparatus comprising:
means for encrypting data by an encryption process to generate ciphertext, modifying a parameter using said ciphertext further encrypting said data using said modified parameter as encryption process information to generate further ciphertext;
means for attaching said encryption process information to said ciphertext and for transmitting said further ciphertext and said encryption process information in order to detect whether said further ciphertext is falsified data.

18. An apparatus for detecting falsification of encrypted data, comprising:
means for receiving encrypted data;
means, receiving said encrypted data from said means for receiving, for decrypting said received encrypted data based on a decryption process to generate decrypted data, including modifying a parameter using said encrypted data, said modified parameter being decrypted data falsification detecting data for detecting whether said encrypted data is falsified data; and
means for comparing said decrypted data falsification detecting data with encrypted data falsification detecting data previously attached to said encrypted data to detect from a resultant comparison whether said encrypted data is falsified data.

19. An apparatus for reproducing encrypted data, comprising:
means for sequentially extracting and decrypting portions of encrypted data from prescribed ones of a plurality of blocks dividing said encrypted data,
said means for sequentially extracting and decrypting comprising, for each portion of said encrypted data in sequence, modifying a parameter for decrypting said encrypted data using a respective portion of said encrypted data,
means, using a parameter determined based on said portion previously extracted, for modifying the parameter based on said portion currently extracted, and generating decrypted data from said sequentially modified parameters of said decrypting and from each said portion of said encrypted data, wherein a last said sequentially modified parameter is a final modified parameter after all portions of said encrypted data are decrypted; and
means for comparing final modified parameter by said means for sequentially modifying, with falsification detecting data previously correlated to said prescribed block for detecting whether said prescribed block is falsified, to determine from a resultant comparison whether to reproduce said decrypted data corresponding to said prescribed block.

20. An apparatus for communicating encrypted data, comprising:
means for receiving encrypted data by means of communication, said encrypted data being previously divided into a plurality of blocks;
means for sequentially extracting and decrypting portions of said received encrypted data from prescribed ones of said plurality of blocks,
said means for sequentially extracting and decrypting comprising, for each portion of said encrypted data in sequence, modifying a parameter for decrypting said respective portion of said encrypted data,
means, using a previously modified parameter, for modifying the parameter based on said portion of encrypted data currently extracted, and generating decrypted data from said sequentially modified parameter and from each said portion of said encrypted data, wherein a last said sequentially modified parameter is a final modified parameter after all portions of said encrypted data are decrypted; and
means for comparing said final modified parameter by said means for sequentially modifying, with falsification detecting data previously correlated to said prescribed block for detecting whether said prescribed block is falsified, to detect from a resultant comparison an error introduced in said communication of said encrypted data.

21. A machine readable recording medium having a program recorded therein for causing a computer to perform a method of encryption, the method including the steps of:
encrypting data by an encryption process to generate ciphertext, modifying a parameter using said ciphertext, further encrypting said data using said modified parameter as encryption process information to generate further ciphertext; and
attaching said encryption process information to said further ciphertext and transmitting said further ciphertext and said attached encryption process information in order to detect whether said further ciphertext is falsified data.

22. A machine readable recording medium having a program recorded therein for causing a computer to perform a method of detecting whether encrypted data is falsified, the method including the steps of:
receiving encrypted data;
decrypting said received encrypted data based on a decryption process to generate decrypted data, including modifying a parameter using said encrypted data, said modified parameter being decrypted data falsification detecting data for detecting whether said encrypted data is falsified data; and
comparing said decrypted data falsification detecting data with encrypted data falsification detecting data previously attached to said encrypted data to detect from a resultant comparison whether said encrypted data is falsified data.

23. A machine readable recording medium having a program recorded therein for causing a computer to perform a method of reproducing encrypted data, the method including the steps of:
sequentially extracting and decrypting portions of said encrypted data from prescribed ones of a plurality of blocks dividing said encrypted data,
said step of sequentially extracting and decrypting comprising, for each portion of said encrypted data in sequence, modifying a parameter for decrypting said encrypted data using a respective portion of said encrypted data, using a parameter determined based on said portion previously extracted to modify the parameter based on said portion currently extracted, and using said sequentially modified parameters of said decrypting to generate decrypted data from each said portion of said encrypted data, wherein a last said sequentially modified parameter is a final modified parameter after all portions of said encrypted data are decrypted; and comparing said final modified parameter with falsification detecting data previously correlated to said prescribed block for detecting whether said prescribed block is falsified, to determine from a resultant comparison whether to reproduce said decrypted data corresponding to said prescribed block.

24. A machine readable recording medium having a program recorded therein for causing a computer to perform a method of communicating encrypted data, the method including the steps of:

receiving encrypted data by means of communication, said encrypted data being previously divided into a plurality of blocks;

sequentially extracting and decrypting portions of said received encrypted data, from prescribed ones of said plurality of blocks;

said step of extracting and decrypting comprising, for each portion of said encrypted data in sequence, modifying a parameter for decrypting said respective portion of said encrypted data using said respective portion of said encrypted data, using a previously modified parameter to modify the parameter based on said decrypting said portion currently extracted, and using said sequentially modified parameter to generate decrypted data from each said portion of said encrypted data, wherein a last said sequentially modified parameter is a final modified parameter after all portions of said encrypted data are decrypted; and comparing said final modified parameter with falsification detecting data previously correlated to said prescribed block for detecting whether said prescribed block is falsified, to detect from a resultant comparison an error introduced in said communication of said encrypted data.

* * * * *